United States Patent Office 3,165,543
Patented Jan. 12, 1965

3,165,543
2α-HALO- AND 2α-HALO-6α-METHYL-17α,21-DI-
HYDROXY-4-PREGNENE-3,20-DIONES
Alan H. Nathan, Kalamazoo, John A. Hogg, Galesburg, and William P. Schneider, Kalamazoo, Mich., assignors to The Upjohn Company, Kalamazoo, Mich., a corporation of Delaware
No Drawing. Filed Apr. 10, 1964, Ser. No. 358,927
33 Claims. (Cl. 260—397.45)

This invention relates to certain novel 2-halogenated steroids and especially 2-chloro-11β,17α,21-trihydroxy-4-pregnene-3,20-dione and 21-esters thereof,
2-fluoro-11β,17α,21-trihydroxy-4-pregnene-3,20-dione and 21-esters thereof,
2,9α-difluoro-11β,17α,21-trihydroxy-4-pregnene-3,20-dione and 21-esters thereof,
2-fluoro-17α,21-dihydroxy-4-pregnene-3,11,20-trione and 21-esters thereof,
2,9α-difluoro-17α,21-dihydroxy-4-pregnene-3,11,20-trione and 21-esters thereof,
2-fluoro-11β,17α-dihydroxy-4-pregnene-3,20-dione,
2,9α-difluoro-11β,17α-dihydroxy-4-pregnene-3,20-dione,
2-fluoro-17α-hydroxy-4-pregnene-3,11,20-trione,
2,9α-difluoro-17α-hydroxy-4-pregnene-3,11,20-trione,
2,21-difluoro-11β,17α-dihydroxy-4-pregnene-3,20-dione,
2,9α,21-trifluoro-11β,17α-dihydroxy-4-pregnene-3,20-dione,
2,21-difluoro-17α-hydroxy-4-pregnene-3,11,20-trione, and
2,9α,21-trifluoro-17α-hydroxy-4-pregnene-3,11,20-trione, physiologically active intermediates in the production thereof, and to processes for their production.

The novel compounds of the present invention and processes for their production may be represented by the following formulae:

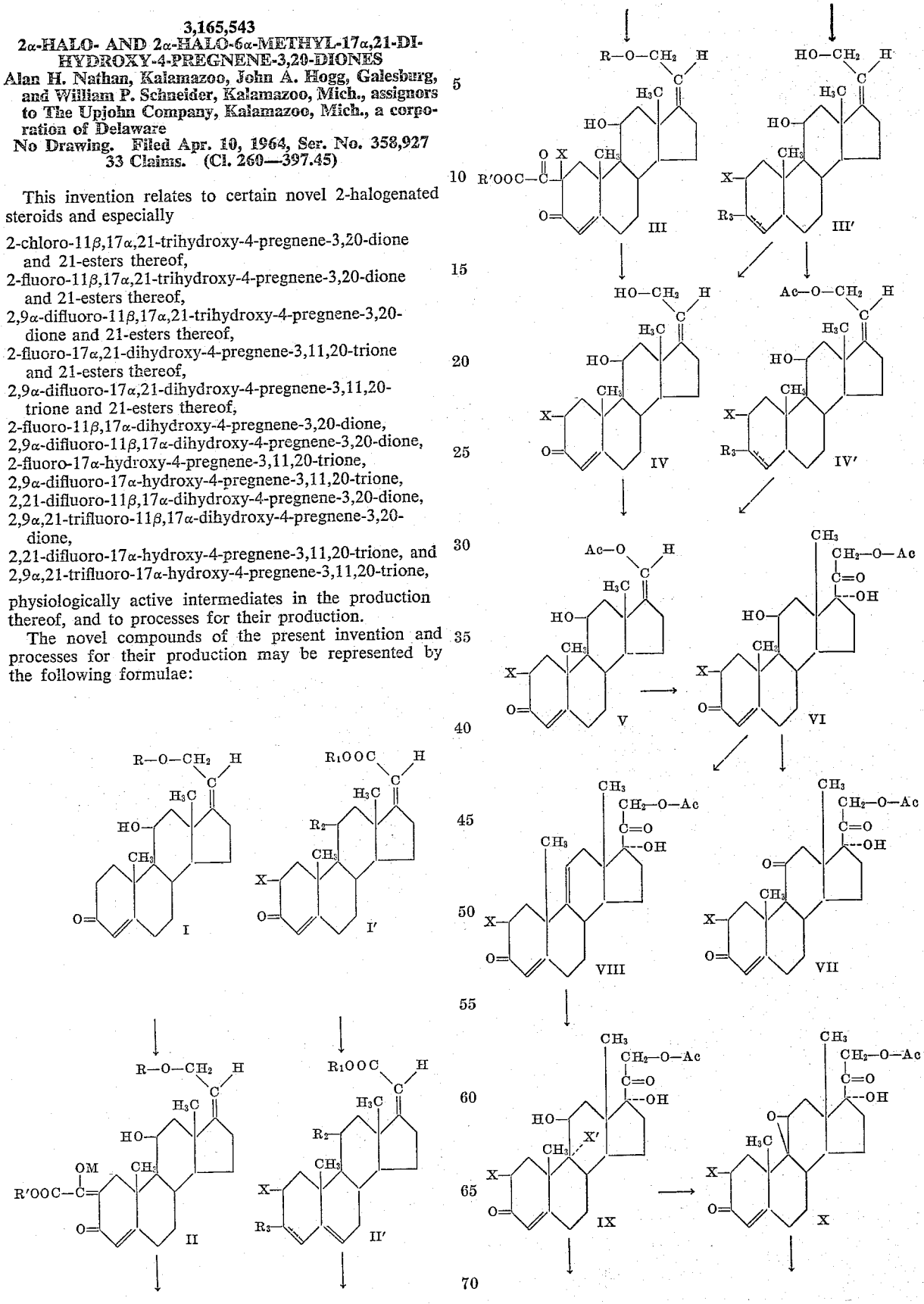

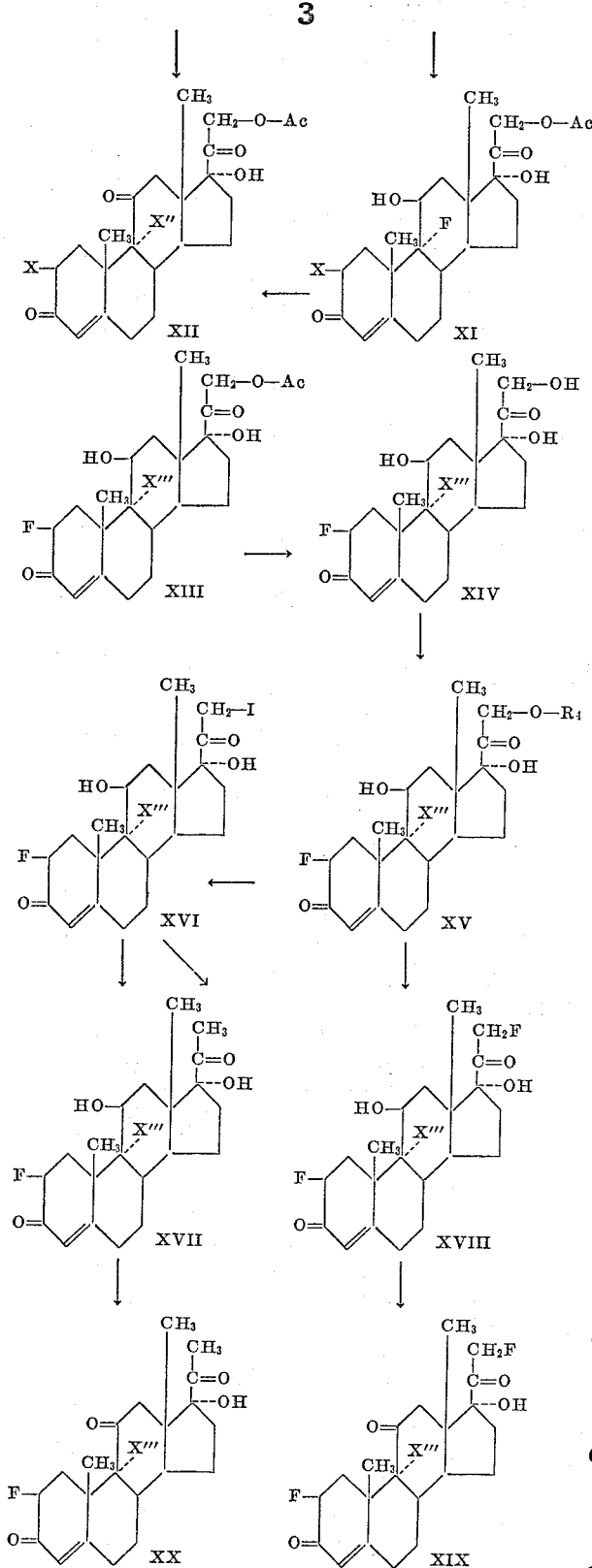

wherein X is a halogen atom having an atomic weight from 19 to 36, inclusive, i.e., fluorine or chlorine, X' is a halogen atom having an atomic weight from 35 to 127, inclusive, i.e., chlorine, bromine or iodine, X" is halogen, i.e., chlorine fluorine bromine or iodine preferably fluorine, X''' is a hydrogen, chlorine or fluorine atom, M is hydrogen or an alkali-metal, R is hydrogen or the acyl radical of a hydrocarbon carboxylic acid containing from one to twelve carbon atoms, inclusive, R' is alkyl, $R_1$ is hydrogen or lower-alkyl, $R_2$ is β-hydroxy or keto, $R_3$ is a ketone-protecting group, e.g., a ketal or enol ether, and $R_4$ is a sulfonyl radical, preferably that of a hydrocarbon sulfonic acid containing from one to twelve carbon atoms, inclusive, e.g., lower alkyl, methyl, aryl, phenyl, p-tolyl sym.-xylyl-sulfonic acid.

The halogen atom at the 2-position in every instance has the alpha stereoconfiguration.

The novel 2-chlorohydrocortisone and 21-esters thereof are prepared by protecting the 3-keto group of an alkyl 2 - chloro - 3-keto-11-oxygenated-4,17(20)-[cis]-pregnadien-21-oate steroid (I', X=Cl) with a ketone-protecting group e.g., an enol ether or ketal group, according to methods known in the art, e.g., reaction of I with ethylene glycol, propylene glycol, trimethylene glycol, methyl alcohol, ethyl alcohol, benzyl alcohol, etc., in the presence of an acidic catalyst, to produce II' (X=Cl). Reduction of II' with lithium aluminum hydride, sodium aluminum hydride or similar chemical reducing agent capable of reducing a carboxylic group to a carbinol is productive of a 3-ketone-protected 2-chloro-11β,21-dihydroxy-4,17(20)-[cis]-pregnadien-3-one (III', X=Cl). Hydrolysis of the 3-ketone protecting group with aqueous acid is productive of 2-chloro-11β,21-dihydroxy-4,17(20)-[cis]-pregnadien-3-one (IV, X=Cl). Acylation of the 21-hydroxy group prior to hydrolysis of the 3-ketone protecting group is productive of a 3-ketone-protected 2 - chloro - 11β-hydroxy-21-acyloxy-4,17(20)-[cis]-pregnadien-3-one (IV', X=Cl), which can be selectively hydrolyzed to produce 2-chloro-11β-hydroxy-21-acyloxy-4,17(20)-[cis]-pregnadien-3-one (IV, X=Cl). Oxidative hydroxylation of IV or preferably a 21-ester thereof (V, X=Cl) with, for example, osmium tetroxide and hydrogen peroxide, is productive of 2-chloro-11β,17α,21-trihydroxy-4-pregnene-3,20-dione (XIV, X=Cl, X'''=H) and 21-esters thereof (VI, X=Cl), respectively.

A 2-chloro-3-keto-11-oxygenated-4,17(20)-[cis]-pregnadiene-21-carbonyloxy steroid (I', X=Cl) is prepared as described in U.S. Patent 2,790,814, e.g., by reacting 11-ketoprogesterone with about two molar equivalents of sodium methoxide and about two to ten molar equivalents of diethyl oxalate in tertiary butyl alcohol, followed by chlorination with about three molar equivalents of chlorine and then by rearrangement with a small excess of sodium methoxide and methanol to produce methyl 2-chloro-3,11-diketo-4,17(20)-[cis]-pregnadien-21-oate (I', $R_1$ is methyl, $R_2$ is keto). Substituting 11β-hydroxyprogesterone for the 11-ketoprogesterone as the starting steroid in the reactions described above is productive of the corresponding 11β-hydroxy steroids. Substituting another lower-alkanol and alkali-metal lower alkoxide for the sodium methoxide and methanol employed above, e.g., sodium ethoxide and ethanol, is productive of other lower-alkyl esters of 2-chloro-3,11-diketo-4,17(20)-[cis]-pregnadien-21-oic acid and 2-chloro-3-keto-11β-hydroxy-4,17(20)-[cis]-pregnadien-21-oic acid. Substituting fluorine or iodoheptafluoride for the chlorine employed above is productive of the corresponding 2-fluoro compound (I', X=fluorine) which is converted in the same manner as the corresponding 2-chloro compounds to 2-fluoro-hydrocortisone (XIV, X=F, X'''=H) and 21-esters thereof (VI, X=F).

The starting 2-chloro compounds (I to VI) can be reacted with a metal fluoride under exchange reaction conditions to produce the corresponding fluoro compounds. The fluoro compounds are converted to 2-fluorohydrocortisone and 21-esters thereof in the same manner as described above for the production of the corresponding 2-chloro compounds. Reacting 2-chloro-11β,21-dihydroxy-4,17(20)-pregnadien-3-one (IV, X=Cl) or 21-esters thereof (V, X=Cl) with sodium iodide in acetone is productive of the corresponding 2-iodo compound which is converted to 2-iodohydrocortisone and 21-esters thereof in the same manner as the corresponding 2-chloro compounds. The 2-bromo compounds are similarly prepared by substituting bromine for chlorine in the preparation of compound I which produce 2-bromohydrocortisone and 21-esters thereof.

An alternative and novel method of producing the 2-fluoro compounds of the present invention involves the following reactions: 11β,21 - dihydroxy - 4,17(20)-[cis]-pregnadien-3-one (I, R=H), [Hogg et al., J. Am. Chem. Soc., 77, 4436 (1955)] is reacted with a dialkyl oxalate, preferably methyl or ethyl oxalate in the presence of an alkali-metal alkoxide, preferably sodium methoxide, sodium ethoxide or potassium tertiary butoxide, in a solvent nonreactive under the reaction conditions, e.g., tertiary butyl alcohol, to produce an alkali-metal enolate of 2 - alkoxyoxalyl-11β,21-dihydroxy-4,17(20)-[cis]-pregnadien-3-one (II, M=alkali-metal). This compound or the corresponding free enol (II, M=H) is then reacted with perchloryl fluoride ($ClO_3F$) to produce 2-fluoro-2-alkoxyoxalyl-11β,21-dihydroxy-4,17(20)-[cis]-pregnadien-3-one (III). Hydrolysis of this compound with base, e.g., methanolic sodium methoxide, is productive of 2-fluoro-11β,21 - dihydroxy-4,17(20)-[cis]-pregnadien-3-one (IV, X=F). Alternatively, starting with a 21-ester of 11β,21-dihydroxy-4,17(20) - [cis]-pregnadien-3-one (I, R=Ac), preferably the acetate, the corresponding 2-alkoxyoxalyl compound (II, R=Ac) and the 2-fluoro-2-alkoxyoxalyl compound (III, R=Ac) are produced. Removal of the 2-alkoxyoxalyl group results in at least partial hydrolysis of the 21-ester group so that the 2-fluoro-21-hydroxy compound (IV, X=F, R=H) results. Esterification of this compound, preferably with acetic anhydride re-introduces the 21-ester group (V, R=Ac, X=F). Oxidative hydroxylation of these compounds, preferably V, according to one of the methods described in U.S. Patents 2,769,825, 2,769,823 or in Hogg et al., J. Am. Chem. Soc., 77, 4436 (1955), is productive of 2-fluoro-11β,17α,21-trihydroxy-4-pregnene-3,20-dione 21-acylate, preferably the 21-acetate, (VI, X=F) which can be hydrolyzed with base, in the manner described above for the hydrolysis of the corresponding 2-chloro compound, to produce 2-fluoro-11β,17α,21 - trihydroxy-4-pregnene - 3,20 - dione (XIV, X=F, X'''=H) or oxidized with an oxidizing agent, e.g., chromic acid or a N-haloacylamide, e.g., N-bromoacetamide, or a N-haloimide, e.g., N-chlorosuccinimide, in pyridine or other like amine, to produce the corresponding ester of 2-fluoro-17α,21-dihydroxy-4-pregnene-3,11,20-trione (VII, X=F), which in turn, is hydrolyzed as described above to 2-fluoro-17α,21-dihydroxy-4-pregnene-3,11,20-trione.

Each of the above-described processes for introducing a 2-halogen atom produces a 2α-halo steroid. Thus the 2-halogen atom of all of the compounds of this invention has the alpha stereoconfiguration.

The 2,9α-dihalo compounds of the present invention are prepared as follows: dehydrating a 2-halo-11β,17α,21-trihydroxy-4-pregnene-3,20-dione 21-acylate (VI), illustratively with sulfuric acid or preferably with a hypohalous acid followed by anhydrous sulfur dioxide, to obtain the corresponding 2 - halo-17α,21-dihydroxy-4,9(11)-pregnadiene-3,20-dione 21-acylate (VIII). Addition of a hypohalous acid, i.e., hypochlorous, hypoiodous or hypobromous acid to this latter compound produces the corresponding 2,9α - dihalo-11β,17α,21-trihydroxy-4-pregnene-3,20-dione 21-acylate (IX), which by treatment with a base, e.g., anhydrous potassium acetate, yields the corresponding epoxy compound (X) e.g., 2-fluoro-9β,11β-epoxy-17α,21-dihydroxy-4-pregnene-3,20-dione 21-acylate. Treatment of this epoxy compound with hydrogen fluoride or other hydrogen fluoride releasing agents produces the highly active 2,9α-difluoro-11β,17α,21-trihydroxy-4-pregnene-3,20-dione 21-acylate (XI). Oxidation of this latter compound, preferably the 21-acetate, with chromic acid in acetic acid provides 2,9α-difluoro-17α,21-dihydroxy-4-pregnene-3,11,20-trione 21-acylate (XII). Hydrolysis of the ester XII with a base provides the free alcohol 2,9α - difluoro-17α,21-dihydroxy-4-pregnene-3,11-20-trione.

The 2,21-difluoro compounds of the present invention are prepared by treating 2-fluoro-11β,17α,21-trihydroxy-4-pregnene-3,20-dione (XIII) or the corresponding 11-keto compound or their 9α-fluoro analogues (XIV) with an organic sulfonyl halide such as methanesulfonyl chloride, toluene-sulfonyl chloride, toluenesulfonyl bromide, benzenesulfonyl chloride, naphthylsulfonyl chloride, or the like, to obtain the corresponding 21-sulfonate ester (XV), e.g., 2-fluoro-11β,17α,21-trihydroxy-4-pregnene-3,-20-dione 21 - methylsulfonate or 21-p-toluenesulfonate, treating the thus-produced 21-alkyl or aryl sulfonate with sodium iodide in acetone solution to obtain the corresponding 21-iodo compound, e.g., 2-fluoro-11β,17α-dihydroxy-21-iodo-4-pregnene-3,20-dione (XVI); treating the thus-obtained 21-iodo compound with silver fluoride, preferably in acetonitrile solution to obtain the corresponding 21-fluoro compound, e.g., 2,21-difluoro-11β,17α-dihydroxy-4-pregnene-3,20-dione (XVIII); and if desired oxidizing the thus-obtained 21-fluoro compound with chromic anhydride, N-bromoacetamide, N-bromosuccinimide, or the like, to give the corresponding 11-keto compound, e.g., 2,21-difluoro-17α-hydroxy-4-pregnene-3,11,-20-trione (XIX). Alternatively, the 21-sulfonate, preferably the 21-methylsulfonate, can be treated directly with potassium fluoride in dimethyl sulfoxide, e.g., at 100 degrees for eighteen hours or longer, to produce 2,21-difluoro-11β,17α-dihydroxy-4-pregnene-3,20-dione directly. The corresponding 2-chloro compound and the 11-keto analogues of these compounds are similarly converted from their 21-sulfonate ester directly to the 21-fluoro compounds.

The 21-unsubstituted compounds of the present invention (XVII, XX), e.g., 2-fluoro-11β,17α-dihydroxy-4-pregnene-3,20-dione, are prepared by treating a 21-iodo compound (XVI), e.g., 2-fluoro-11β,17α-dihydroxy-21-iodo-4-pregnene-3,20-dione with a reducing agent such as sodium thiosulfate, sodium bisulfite, potassium bisulfite, or the like, in an aqueous organic solvent mixture to obtain the corresponding 21-unsubstituted compound (XVII) and if desired oxidizing the thus-obtained 2-fluoro - 11β,17α-dihydroxy-4-pregnene - 3,20 - dione with chromic anhydride, N-bromoacetamide, N-bromosuccinimide, or the like, to give the corresponding 11-keto compound (XX), e.g., 2-fluoro-17α-hydroxy-4-pregnene-3,11,-20-trione. The 9α-chloro and 9α-fluoro-21-unsubstituted compounds (XVII, XX, X'''=Cl, F), are prepared by substituting the corresponding 9α-halo-21-iodo compounds (XVI, X'''=Cl, F) as starting compounds in the above-described reaction.

It is an object of this invention to provide the novel 2-chloro and 2-fluoro-11β,17α,21-trihydroxy-4-pregnene-3,20-dione and 21-esters thereof, 2-chloro-9α-fluoro and 2,9α - difluoro - 11β,17α,21-trihydroxy-4-pregnene-3,20-dione, esters thereof and the 9α-bromo, 9α-iodo and 9α-chloro analogues thereof that are intermediates in the production of the 9α-fluoro compound, as well as the 9(11)-dehydro and 9β,11β-epoxy intermediates in the production of the 9α-fluoro compound, 2-chloro and 2-fluoro-17α,21-dihydroxy-4-pregnene-3,11,20-trione and 21-esters thereof, 2-chloro-9α-fluoro and 2,9α-difluoro-17α,21-dihydroxy-4-pregnene-3,11,20-trione and 21-esters thereof, as well as the 9α-chloro, 9α-bromo and 9α-iodo analogues thereof, 2 - fluoro - 11β,17α-dihydroxy-4-pregnene-3,20-dione, 2,9α - difluoro-11β,17α-dihydroxy-4-pregnene-3,20-dione and intermediates in the production thereof, 2-fluoro-17α-hydroxy-4-pregnene-3,11,20-trione, 2,9α-difluoro-17α-hydroxy-4-pregnene-3,11-20-trione, 2,21-difluoro-11β,17α-dihydroxy - 4 - pregnene - 3,20 - dione, 2,9α,21 - trifluoro-11β,17α-dihydroxy-4-pregnene-3,20-dione, and intermediates in the production thereof, 2,21-difluoro-17α-hydroxy-4-pregnene-3,11,20-trione, 2,9α,21-trifluoro-17α - hydroxy-4-pregnene-3,11,20-trione and intermediates in the production thereof. It is another object to provide processes for the production thereof and pharmaceutical preparations and mixtures thereof. Other objects will be apparent to those skilled in the art to which this invention pertains.

The novel 2-halo compounds of this invention (VI–XX) possess a high order of physiological activities, and possess activity spectra different from the adrenocortical hormones found in nature such as hydrocortisone and cortisone or other known compounds without the 2-halo group especially in their effect on mineral and water-metabolism. These compounds, especially VI, VII, XI, XII, XIV, XVII, XVIII, XIX and XX, possess useful anti-inflammatory activity. These compounds cause less salt and water retention than the corresponding analogues without the 2-halo group, which makes them especially valuable in the management of inflammatory conditions concurrent with chronic congestive heart failure, of cirrhosis of the liver, the nephrotic syndrome and eclampsia and preeclampsia.

The novel 2-halo compounds of this invention are useful in oral, parenteral and topical compositions. In oral compositions the material may be given as tablets illustratively using either polyethylene glycol 4000 or 6000 as a carrier or lactose and/or sucrose as a diluent. They are useful for topical application as ointments, lotions, jellies, creams, suppositories, bougies, aqueous suspensions, etc. Examples of advantageous topical compositions are given below. While the examples below are to the 2-fluoro-11β,17α,21-trihydroxy-4-pregnene-3,20-dione, physiologically equivalent amounts of the other 2-fluoro analogues of the compound of this invention are substitutable therein.

A dermatological and ophthalmic ointment has the following composition:

| | Lbs. |
|---|---|
| Wool fat, U.S.P. | 100 |
| Mineral oil, U.S.P. | 125 |
| 2 - fluoro - 11β,17α,21-trihydroxy-4-pregnene-3,20-dione (micronized) | 18 |
| White petrolatum, U.S.P. | 500 |

Incorporation of an antibiotic in the ointment, especially neomycin sulfate, has therapeutic advantages each active ingredient potentiating and supplementing the useful properties of the other. Such an ointment is as follows:

| | Lbs. |
|---|---|
| Wool fat, U.S.P. | 100 |
| Mineral oil, U.S.P. | 125 |
| Neomycin sulfate | 3 |
| 2 - fluoro - 11β,17α,21-trihydroxy-4-pregnene-3,20-dione (micronized) | 18 |
| White petrolatum, U.S.P. | 500 |

In place of, or in addition to, neomycin sulfate, other antibiotics such as novobiocin, bacitracin, circulin, polymyxin B sulfate, gramicidin, streptomycin sulfate, dihydrostreptomycin sulfate, oxytetracycline, chlortetracycline, tetracycline, chloramphenicol and the sulfonamides can be used in conjunction with the steroids of the present invention for preparations such as the above ointments.

The following preparations and examples are illustrative of the process and products of the present invention, but are not to be construed as limiting.

PREPARATION 1

*Methyl 2-Chloro-3,11-Diketo-4,17(20)-[Cis]-Pregnadien-21-Oate*

A solution of 6.57 grams (0.02 mole) of 11-ketoprogesterone in 100 milliliters of tertiary butyl alcohol was prepared at seventy degrees centigrade in an atmosphere of nitrogen. When the temperature of the solution dropped to 55 degrees centigrade, there was added with stirring 11.7 grams (0.08 mole) of ethyl oxylate and 2.70 grams of sodium methoxide (0.05 mole) as a 25 percent solution in methanol, all in an atmosphere of nitrogen. Stirring was continued for about fifteen minutes while permitting the temperature to drop to about 37 degrees centigrade. A solution of 1.70 grams of glacial acetic acid and 2.46 grams of sodium acetate in 160 milliliters of methanol, cooled to ten degrees centigrade, was then added. The resulting dark green solution was cooled to about zero degrees centigrade and chlorine gas was added until the solution turned cloudy and white and a positive test for halogen on moistened starch-potassium iodide paper was obtained. The mixture was stirred for five minutes and, if a negative test for halogen was obtained, more chlorine was added until a positive test was obtained. This procedure was repeated until a persistent positive test for halogen was obtained. It was important, however, not to add more than just enough chlorine to give a positive test. The temperature of the reaction mixture was maintained at between zero and five degrees centigrade during the chlorination which took about forty minutes.

To the resulting halogenated mixture was added 4.536 grams of sodium methoxide as a 25 percent solution in methanol. The temperature of the reaction mixture was permitted to rise to about 25 degrees centigrade. The mixture was maintained at this temperature for two hours and then poured into 1.7 liters of a mixture of ice and water. The resulting steroidal precipitate was filtered, washed thoroughly with water, filtered and dried. The dried crude product weighed 7.67 grams and melted at 100 to 120 degrees centigrade.

The precipitate was dissolved in benzene and poured over a column of thirty grams of Florisil synthetic magnesium silicate. The column was washed with a total volume of 390 milliliters of benzene and then developed with 130 milliliters of Skellysolve B hexane hydrocarbons plus ten percent acetone. The eluate fractions containing the bulk of the crystalline material were combined to give 3.51 grams of methyl 2-chloro-3,11-diketo-4,17 (20)-[cis]-pregnadien-21-oate melting at about 185 to 189 degrees centigrade. Recrystallization of these crystals from ethyl acetate gave colorless prisms melting at 192 to 193 degrees centigrade, having an $[\alpha]_D$ of pulse 214 degrees in chloroform and the analysis below.

Calculated for $C_{22}H_{27}ClO_4$: C, 67.59; H, 6.96; Cl, 9.07. Found: C, 67.94; H, 6.84; Cl, 8.46.

PREPARATION 2

*The 3-Ethylene Glycol Ketal of Methyl 2-Chloro-3,11-Diketo-4,17(20)-[Cis]-Pregnadien-21-Oate*

A solution of 3.71 grams of methyl 2-chloro-3,11-diketo-4,17(20)-[cis]-pregnadien-21-oate and 0.360 gram of paratoluenesulfonic acid dissolved in a mixture of 180 milliliters of benzene and ten milliliters of ethylene glycol was refluxed for eight hours with continual removal of the water of reaction by a water trap. The cooled benzene solution was shaken with aqueous sodium bicarbonate, dried and then poured over a column of 220 grams of Florisil magnesium silicate. The column was developed with nine 300-milliliter portions of Skellysolve B plus four percent acetone and six 300-milliliter portions of Skellysolve B plus eight percent acetone. The sixth through twelfth 300-milliliter eluate fractions contained 3.37 grams of the 3-ethylene glycol ketal of methyl 2-chloro-3,11-diketo-4,17(20)-[cis]-pregnadien - 21 - oate whose melting point varied from about 147 to about 203 degrees centigrade with no apparent difference in purity. The infrared absorption spectrum of this product was consistent with the structure. The product has an $E_{223}$ of 11,225 and the analysis below.

Calculated for $C_{24}H_{31}ClO_5$: C, 66.27; H, 7.18; Cl, 8.15. Found: C, 66.38; H, 7.35; Cl, 7.63.

PREPARATION 3

*The 3-Ethylene Glycol Ketal of 2-Chloro-11β,21-Dihydroxy-4,17(20)-[Cis]-Pregnadien-3-One*

To a solution of 0.5 gram of lithium aluminum hydride in 75 milliliters of ether was added a solution of 1.71 grams of the 3-ethylene glycol ketal of methyl 2-chloro- 3,11-diketo-4,17-(20)-[cis]-pregnadien-21-oate in thirty milliliters of benzene. The mixture was stirred for one hour and then decomposed by the addition of 2.4 milliliters of ethyl acetate followed by one milliliter of water. The ether layer was decanted and the residual salts washed thoroughly with ether. The combined ether solutions were evaporated to dryness to give 1.477 grams of the 3-ethylene glycol ketal of 2-chloro-11β,21-dihydroxy-4,17(20)-[cis]-pregnadien-3-one melting at 156 degrees centigrade with decomposition. Recrystallization of these crystals from ethyl acetate gave product melting at 156.5 to 157.5 degrees centigrade with decomposition and having the analysis below.

Calculated for $C_{23}H_{33}ClO_4$: Cl, 8.67. Found: Cl, 8.14, 8.81.

PREPARATION 4

*The 3-Ethylene Glycol Ketal of 2-Chloro-11β,21-Dihydroxy-4,17(20)-[Cis]-Pregnadien-3-One 21-Acetate*

A solution of 243 milligrams of the 3-ethylene glycol ketal of 11β,21-dihydroxy-4,17(20)-[cis]-pregnadien-3-one in 1.62 milliliters of pyridine and 2.43 milliliters of acetic anhydride was maintained at room temperature for four hours. The solution was poured into water to give a white gum which crystallized upon trituration with a ten percent aqueous solution of hydrochloric acid. The crystals, upon drying, weighed 255 milligrams and melted at 130 to 134 degrees centigrade. Recrystallization of these crystals from a mixture of acetone and Skellysolve B hexane hydrocarbons gave the 3-ethylene glycol ketal of 11β, 21-dihydroxy-4,17(20)-[cis]-pregnadien-3-one and 21-acetate melting at 143 to 144 degrees centigrade and having the analysis below.

Calculated for $C_{25}H_{35}ClO_5$: Cl, 7.86; acetyl, 9.54. Found: Cl, 7.90; acetyl, 9.1.

PREPARATION 5

*2-Chloro-11β,21-Dihydroxy-4,17(20)-[Cis]-Pregnadien-3-One 21-Acetate*

A solution of 575 milligrams of crude 3-ethylene glycol ketal of 2-chloro-11β,21-dihydroxy-4,17(20)-[cis]-pregnadien-3-one 21-acetate in 4.6 milliliters of methanol was mixed with 0.05 milliliter of 5 N hydrochloric acid at room temperature for three hours. The solution was then cooled to minus fifteen degrees centigrade. There was precipitated from the chilled solution 226 milligrams of 2-chloro-11β,21-dihydroxy - 4,17(20) - [cis]-pregnadien-3-one 21-acetate melting at 149 to 153 degrees centigrade. Recrystallization of this product from a small amount of ethyl acetate plus a large volume of Skellysolve B raised the melting point to 156 to 159 degrees centigrade. A second recrystallization gave 2-chloro-11β,21-dihydroxy-4, 17(20)-[cis]-pregnadien-3-one 21-acetate melting at 169.5 to 171 degrees centigrade, having an $E_{244}$ of 17,200 and the analysis below.

Calculated for $C_{23}H_{31}ClO_4$: C, 67.88; H, 7.68; Cl, 8.71. Found: C, 66.42; H, 7.56; Cl, 7.56.

Similarly, the 3-ethylene glycol ketal of 2-chloro-11β,21-dihydroxy-4,17(20)-[cis]-pregnadien-3-one is converted to other 2-chloro-11β,21-dihydroxy-4,17(20)-[cis] - pregnadiene-3-one 21-acylates by esterification of the 21-hydroxy group, e.g., by reaction with the appropriate acid anhydride, in the presence of a basic catalyst such as pyridine or sodium acetate followed by the hydrolysis of the 3-ethylene glycol ketal group. Examples of 2-chloro-11β,21-dihydroxy-4,17(20)-[cis]-pregnadien-3-one 21 - acylates which can be prepared include those wherein the acyl radical of the 21-acylate group is that of, for example, a lower-aliphatic acid, e.g., formic, propionic, butyric, isobutyric, valeric, isovaloric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylidene-acetic, cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3 or 4-methylbenzoic, 2,3-, 2,4-, 2,5-, 2,6-3,4- and 3,5-dimethylbenzoic, ethylbenzoic 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, etc.

PREPARATION 6

*2-Fluoro-11β,21-Dihydroxy-4,17(20)-[Cis]-Pregnadien-3-One*

A solution of 7.45 grams of 11β,21-dihydroxy-4,17 (20)-[cis]-pregnadien-3-one 21-acetate, [Hogg et al., J. Am. Chem. Soc., 77, 4436 (1955)], in 100 milliliters of tertiary butyl alcohol was stirred and heated to 65 degrees centigrade under a nitrogen atmosphere. Heating was stopped and 5.45 milliliters of ethyl oxalate and 6.57 milliliters of a methanol solution containing 1.62 grams of sodium methoxide was added. After stirring for one-half hour, 100 milliliters of ether was added. The yellow precipitate was collected, washed with ether and dried. There was obtained 10.60 grams.

The precipitate was dissolved in 150 milliliters of methanol and the solution cooled to zero degrees centigrade. Gaseous perchloryl fluoride ($ClO_3F$) was passed in at a rate slow enough to keep the temperature below five degrees centigrade. 3.2 times the theoretical amount perchloryl fluoride was added and the excess was then destroyed with an equivalent weight of sodium methoxide in methanol. After stirring for fifteen minutes, the solution was poured into about 700 milliliters of ice water. The white solid that precipitated was collected, washed thoroughly with water and then dried in a vacuum oven at fifty degrees centigrade. There was obtained 6.08 grams which was dissolved in hexane hydrocarbons (Skellysolve B) and poured over a sixty gram column of magnesium silicate (Florisil). The column was developed with hexane hydrocarbons containing increasing proportions of acetone. Hexanes plus seven percent acetone eluted 0.077 gram of 2-fluoro-11β,21-dihydroxy-4, 17(20)-[cis]-pregnadien-3-one 21-acetate, melting at 163 to 169 degrees centigrade and hexanes plus twenty percent acetone eluted 2.76 grams of 2-fluoro-11β,21-dihydroxy-4,17(20)-[cis]-pregnadien-3-one melting at 176.5 to 178.5 degrees centigrade, having an $[\alpha]_D$ of plus 195 degrees ($CHCl_3$), a $\lambda_{max}$ of 241.5 m$\mu$, $a_M$ 13,850 and the analysis below.

Calculated for $C_{21}H_{29}FO_3$: C, 72.38; H, 8.39; F, 5.45. Found: C, 72.49; H, 8.21; F, 5.35.

PREPARATION 7

*2-Fluoro-11β,21-Dihydroxy-4,17(20)-[Cis]-Pregnadien-3-One 21-Acetate*

A solution of 7.45 grams (0.02 mole) of 11β,21-dihydroxy-4,17(20)-[cis])-pregnadien-3-one 21 acetate in 100 milliliters of dry tertiary butyl alcohol was mixed in a nitrogen atmosphere at 65 degrees centigrade with 5.85 grams of ethyl oxalate and 5.15 grams of methanolic solution containing 1.35 grams of sodium methoxide. The stirred mixture was maintained at this temperature and under nitrogen atmosphere for one-half hour.

To the resulting solution was added 0.60 gram of glacial acetic acid, thus producing the free enolate, followed by 2.48 grams of anhydrous sodium acetate in 170 milliliters of methanol. The clear orange solution that resulted was cooled to zero degrees centigrade and kept in an ice bath while perchloryl fluoride ($ClO_3F$) gas was bubbled into the solution. The color of the solution gradually faded and after about 45 minutes it reached its lightest hue.

A methanolic solution containing 1.39 grams of sodium methoxide was then added to the resulting solution and stirring was continued at room temperature for one hour. The solution was poured into one liter of ice water, precipitating 6.92 grams of 2-fluoro-11β,21-dihydroxy-4,17 (20)-[cis]-pregnadien-3-one melting at 124 to 127 degrees centigrade.

The dried product was left standing overnight in a mixture of fifty milliliters each of acetic anhydride and pyridine and was then poured into ice water. The precipitated product was extracted with 500 milliliters of methylene chloride which was dried and then poured over a chromatographic column of 280 grams of magnesium silicate (Florisil). The column was developed with 500-milliliter fractions of solvent of the following composition and order: Four fractions of hexane hydrocarbons (Skellysolve B) plus seven percent acetone, six of hexanes plus ten percent acetone, six of hexanes plus fifteen percent acetone and one of acetone. The residues from fractions five to nine (not counting the methylene chloride) were combined and recrystallized once from acetone and once from 95 percent ethanol. There was obtained 2-fluoro-11β,21-dihydroxy-4,17(20) - [cis]-pregnadien-3-one 21-acetate melting at 199 to 201 degrees centigrade, $[\alpha]_D$ plus 185 degrees (CHCl$_3$), $\lambda_{max.}$ 241 m$\mu$, $a_M$ 14,775. Infrared and ultraviolet spectrum analysis were consistent with the structure.

Calculated for $C_{23}H_{31}FO_4$: C, 70.74; H, 8.00; F, 4.87. Found: C, 70.95; H, 8.00; F, 4.61.

EXAMPLE 1

2-Fluoro-11β,17α,21-Trihydroxy-4-Pregnene-3,20-Dione 21-Acetate

A solution of 0.503 grams of 2-fluoro-11β,21-dihydroxy-4,17(20)-[cis]-pregnadien-3-one 21 acetate in 6.5 milliliters of tertiary butyl alcohol, 0.65 milliliter of pyridine and two milliliters of methylene chloride was mixed with 1.58 milligrams of osmium tetroxide and 600 milligrams of N-methylmorpholine oxide peroxide (U.S. Patent 2,769,823) in tertiary butyl alcohol and then stirred for seventeen hours at room temperature. One-tenth gram of filter aid (Magnesol) and two milliliters of a one percent aqueous sodium hydrosulfite solution was added and the mixture filtered, diluted with water and extracted with ether. The ether solution was washed with water, dilute hydrochloric acid and an aqueous sodium chloride solution, dried over sodium sulfate and the solvent then evaporated. The 0.48 gram of residual oil was dissolved in hexane hydrocarbons and chromatographed over a 35-gram column of magnesium silicate (Florisil). The desired product was eluted with fifteen and twenty percent acetone in hexanes (Skellysolve B). The 0.351 gram of 2-fluoro-11β,17α,21-trihydroxy-4-pregnene - 3,20-dione 21-acetate thus obtained melted, after recrystallization from a mixture of ethyl acetate and hexanes, at 194 to 199 degrees centigrade, had an $[\alpha]_D$ of plus 172 degrees (CHCl$_3$), a $\lambda_{max.}$ of 243 m$\mu$, $a_M$ 14,875 and the analysis below.

Calculated for $C_{23}H_{31}O_6F$: C, 65.38; H, 7.40; F, 4.50. Found: C, 65.68; H, 7.85; F, 3.97.

EXAMPLE 2

2-Chloro-11β,17α,21-Trihydroxy-4-Pregnene-3,20-Dione 21-Acetate

To a solution of 267 milligrams of 2-chloro-11β,21-dihydroxy-4,17(20)-[cis]-pregnadien - 3 - one 21 - acetate dissolved in thirteen milliliters of tertiary butyl alcohol was added 0.127 milliliter of pyridine followed by a solution of 245 milligrams of N-methylmorpholine oxide peroxide in one milliliter of tertiary butyl alcohol and 2.4 milligrams of OsO$_4$ in 0.5 milliliter of tertiary butyl alcohol. The N-methylmorpholine oxide peroxide is prepared by the reaction of N-methylmorpholine with two molar equivalents of anhydrous hydrogen peroxide in tertiary butyl alcohol. The mixture was maintained at about 25 degrees centigrade for eighteen hours and then mixed with 0.5 milliliter of a 0.5 N aqueous solution of Na$_2$S$_2$O$_4$ and some Magnesol filter aid. The solution was filtered and most of the tertiary butyl alcohol distilled from the filtrate at reduced pressure and at room temperature. The concentrate was diluted with ten milliliters of water added portionwise. The steroidal precipitate was filtered and dried to give 2-chloro-11β,17α,21-trihydroxy-4-pregnene-3,20-dione 21-acetate melting at 175 to 178 degrees centigrade.

Following the procedure described above, other 21-esters of 2-chloro-11β,21-dihydroxy-4,17(20)-[cis]-pregnadien-3-one, e.g., the esters described in the paragraph following Preparation 5, are converted to the corresponding 21-esters of a 2-chlorohydrocortisone. Similarly, 2-chloro-11β,21-dihydroxy - 4,17(20) - [cis]-pregnadien-3-one is converted to 2-chlorohydrocortisone.

EXAMPLE 3

2-Fluoro-17α,21-Dihydroxy-4-Pregnene-3,11,20-Trione 21-Acetate

A solution of 0.35 gram of sodium dichromate dihydrate and 0.8 milliliter of concentrated sulfuric acid in five milliliters of water was cooled to room temperature and then mixed with a solution of 0.50 gram of 2-fluoro-11β,17α,21-trihydroxy-4-pregnene - 3,20 - dione 21-acetate in fifteen milliliters of methylene chloride. The mixture was stirred for four hours and then extracted with methylene chloride. The extracts were washed successively with aqueous sodium sulfite, aqueous sodium bicarbonate and then with water, dried over sodium sulfate and the solvent then evaporated. The crystalline residue was recrystallized from ethanol to give fine white needles of 2-fluoro-17α,21-dihydroxy-4-pregnene - 3,11,20 - trione 21-acetate melting at 219 to 233 degrees centigrade. A second recrystallization from methanol raised the melting point to 229 to 244 degrees.

Calculated for $C_{23}H_{29}FO_6$: C, 65.70; H, 6.95; F, 4.52. Found: C, 66.05; H, 6.93; F, 3.43.

EXAMPLE 4

2-Chloro-17α,21-Dihydroxy-4-Pregnene-3,11,20-Trione 21-Acetate

Following the procedure of Example 3, 2-chloro-11β,17α,21-trihydroxy-4-pregnene-3,20 dione 21-acetate was oxidized to 2 - chloro - 17α,21 - dihydroxy - 4 - pregnene-3,11,20-trione 21-acetate.

EXAMPLE 5

2-Chloro-11β,17α,21-Trihydroxy-4-Pregnene-3,20-Dione

A solution of 438 milligrams of 2-chlorohydrocortisone acetate in four milliliters of methanol was freed of oxygen by bubbling nitrogen therethrough. A solution of 404 milligrams of potassium bicarbonate in four milliliters of water was similarly freed of oxygen. The two solutions were mixed at a temperature of between eighteen and twenty degrees centigrade and in a nitrogen atmosphere. The mixture was stirred at room temperature for five hours while protecting it from atmospheric oxygen with nitrogen. At the end of this time the solution was neutralized with glacial acetic acid. The neutral solution was concentrated by distillation at room temperature and reduced pressure and then chilled in a refrigerator for sixteen hours. The precipitated 2-chlorohydrocortisone was filtered and dried.

EXAMPLE 6

2-Fluoro-11β,17α,21-Trihydroxy-4-Pregnene-3,20-Dione

Following the procedure of Example 5, 2-fluoro-11β,17α,21 - trihydroxy-4-pregnene-3,20-dione 21-acetate was hydrolyzed to 2-fluoro-11β,17α,21-trihydroxy-4-pregnene-3,20-dione melting at 212 to 221 degrees centigrade.

EXAMPLE 7

2-Fluoro-17α,21-Dihydroxy-4-Pregnene-3,11,20-Trione

Following the procedure of Example 5, 2-fluoro-17α,21-dihydroxy-4-pregnene-3,11,20-trione 21 - acetate was hydrolyzed to 2-fluoro-17α,21-dihydroxy-4-pregnene-3,11,20-trione.

EXAMPLE 8

2-Chloro-17α,21-Dihydroxy-4-Pregnene-3,11,20-Trione

Following the procedure of Example 5, 2-chloro-17α, 21-dihydroxy-4-pregnene-3,11,20-trione 21-acetate was hydrolyzed to 2-chloro-17α,21-dihydroxy-4-pregnene-3, 11,20-trione.

EXAMPLE 9

2-Fluoro-17α,21-Dihydroxy-4,9(11)-Pregnadiene-3,20-Dione 21-Acetate

To a solution of 530 milligrams of 2-fluoro-11β,17α,21-trihydroxy-4-pregnene-3,20-dione 21-acetate in five milliliters of pyridine, in a nitrogen atmosphere, was added 225 milligrams of N-bromoacetamide. After standing at room temperature under nitrogen for a period of thirty minutes, the reaction solution was cooled to ten to fifteen degrees centigrade and, with shaking, sulfur dioxide gas was passed over the surface until the solution gave no color with acidified starch-iodine paper. During the addition of sulfur dioxide gas, the reaction became warm. The temperature was kept under thirty degrees centigrade by external cooling and by varying the rate of sulfur dioxide addition. After standing at room temperature for a period of fifteen minutes, the reaction mixture was poured into thirty milliliters of ice water and the resulting gummy precipitate extracted with fifty milliliters of ether. The ether extract was washed with five percent hydrochloric acid solution and water, dried over anhydrous sodium sulfate, and evaporated to dryness to give 2-fluoro-17α,21-dihydroxy-4,9(11)-pregnadiene-3,20-dione 21-acetate.

EXAMPLE 10

2-Fluoro-9α-Bromo-11β,17α,21-Trihydroxy-4-Pregnene-3,20-Dione 21-Acetate

To a solution of 332 milligrams of 2-fluoro-17α,21-dihydroxy-4,9(11)-pregnadiene-3,20-dione 21-acetate in five milliliters of methylene chloride and 9.9 milliliters of tertiary butyl alcohol was added a solution of 0.83 milliliter of 72 percent perchloric acid in 5.8 milliliters of water followed by a solution of 142 milligrams of N-bromoacetamide in 2.5 milliliters of tertiary butyl alcohol. After stirring the reaction mixture for fifteen minutes, a solution of 142 milligrams of sodium sulfite in seven milliliters of water was added and the reaction mixture was concentrated to a volume of about 25 milliliters under reduced pressure at about sixty degrees centigrade. The concentrate was cooled in an ice bath while stirring and 35 milliliters of water was added. After stirring for a period of twenty minutes, the crystalline product was isolated by filtration, the crystals were washed with water and air-dried to give 2-fluoro-9α-bromo-11β,17α,21-trihydroxy-4-pregnene-3,20-dione 21-acetate.

EXAMPLE 11

2-Fluoro-9β,11β-Epoxy-17α-21-Dihydroxy-4-Pregnene-3,20-Dione 21-Acetate

To a solution of 406 milligrams of 2-fluoro-9α-bromo-11β,17α,21-trihydroxy-4-pregnene-3,20-dione 21-acetate in fifteen milliliters of acetone was added 406 milligrams of potassium acetate and the resulting suspension was heated under reflux for a period of eighteen hours. The mixture was then concentrated to five milliliters of volume on the steam bath and thereupon ten milliliters of water was added. The product was separated by filtration and recrystallized from acetone to give 2-fluoro-9β,11β-epoxy-17α,21-dihydroxy-4-pregnene-3,20-dione 21-acetate.

EXAMPLE 12

2,9α-Difluoro-11β,17α,21-Trihydroxy-4-Pregnene-3,20-Dione 21-Acetate

To a solution of 230 milligrams of 2-fluoro-9β,11β-epoxy-17α,21-dihydroxy-4-pregnene-3,20-dione 21-acetate in five milliliters of methylene chloride was added 1.2 milliliters of a 48 percent aqueous solution of hydrogen fluoride. The two-phase mixture was stirred for a period of twenty hours, then diluted with fifteen milliliters of methylene chloride and carefully poured into forty milliliters of water containing four grams of sodium bicarbonate. After shaking to neutralize the excess hydrogen fluoride, the methylene chloride was separated and the water phase was extracted with more methylene chloride. The combined methylene chloride solution was dried over anhydrous sodium sulfate, diluted with 25 milliliters of ether and chromatographed over twenty grams of magnesium silicate (Florisil). The column was eluted with hexanes (Skellysolve B) containing increasing proportions of acetone to give substantially pure 2,9α-difluoro-11β,17α,21-trihydroxy-4-pregnene-3,20-dione 21-acetate.

In the same manner as shown in Examples 9 to 12, 2-chloro-11β,17α,21-trihydroxy-4-pregnene-3,20-dione 21-acetate was treated with N-chlorosuccinimide and anhydrous sulfur dioxide to give 2-chloro-17α,21-dihydroxy-4,9(11)-pregnadiene-3,20-dione 21-acetate. Treating the thus-obtained 2-chloro-17α,21-dihydroxy-4,9(11)-pregnadiene-3,20-dione 21-acetate with N-chloroacetamide in the presence of aqueous perchloric acid as shown in Example 10 yielded 2,9α-dichloro-11β,17α,21-trihydroxy-4-pregnene-3,20-dione 21-acetate. Treating the thus-obtained 2,9α-dichloro-11β,17α,21-trihydroxy-4-pregnene-3,20-dione 21-acetate with potassium acetate in acetone solution under reflux conditions, as shown in Example 11, gave the corresponding 2-chloro-9β,11β-epoxy-17α,21-dihydroxy-4-pregnene-3,20-dione 21-acetate. Treating the thus-obtained 2-chloro-9β,11β-epoxy-17α,21-dihydroxy-4-pregnene-3,20-dione 21-acetate with hydrogen fluoride in chloroform solution produced the 2-chloro-9α-fluoro-11β,17α,21-trihydroxy-4-pregnene-3,20-dione 21-acetate.

EXAMPLE 13

2,9α-Difluoro-17α,21-Dihydroxy-4-Pregnene-3,11,20-Trione 21-Acetate

A solution of fifty milligrams of 2,9α-difluoro-11β,17α, 21-trihydroxy-4-pregnene-3,20-dione 21-acetate, twenty milligrams of chromic anhydride and one drop of water in one milliliter of acetic acid was shaken several times at room temperature and allowed to stand for four hours. Thereafter it was poured into ten milliliters of water and refrigerated for twenty hours at about five degrees centigrade. The steroid which separated from the aqueous mixture was collected on filter paper and dried to give 2,9α-difluoro-17α,21-dihydroxy-4-pregnene-3,11,20-trione 21-acetate.

Oxidizing 2-chloro-9α-fluoro-11β,17α,21-trihydroxy-4-pregnene-3,20-dione 21-acetate with chromic anhydride in the manner shown in Example 13 produces 2-chloro-9α-fluoro-17α,21-dihydroxy-4-pregnene-3,11,20-trione 21-acetate.

EXAMPLE 14

2,9α-Difluoro-11β,17α,21-Trihydroxy-4-Pregnene-3,20-Dione 100 milligrams of 2,9α-difluoro-11β,17α,21-trihydroxy-4-pregnene-3,20-dione 21-acetate were dissolved in a solution consisting of two milliliters of methanol and 0.1 milliliter of water, previously purged of air-oxygen by passing nitrogen through it, and to the resulting solution was added fifty milligrams of potassium carbonate. The mixture was allowed to stand at room temperature for a period of six hours in a nitrogen atmosphere, thereupon neutralized with five percent aqueous hydrochloric acid solution, diluted with five milliliters of water and refrigerated. The mixture was then filtered and the solids recrystallized from acetone-Skellysolve B hexanes to give pure 2,9α-difluoro-11β,17α,21-trihydroxy-4-pregnene-3,20-dione.

In the manner given in Example 14, hydrolyzing 2,9α- difluoro - 17α,21 - dihydroxy-4-pregnene - 3,11,20 - trione 21-acetate with potassium hydroxide in methanol yielded the 2,9α-difluoro - 17α,21 - dihydroxy-4-pregnene-3,11,20-trione.

In the same manner as given in Example 14, hydrolyzing 2-chloro-9α-fluoro - 11β,17α,21 - trihydroxy-4-pregnene-3,20-dione 21-acetate with sodium hydroxide in a nitrogen atmosphere produces 2-chloro-9α-fluoro-11β,17α, 21 - trihydroxy - 4 - pregnene - 3,20 - dione. Similarly, 2-chloro-9α-fluoro - 17α,21 - dihydroxy-4-pregnene-3,11, 20-trione 21-acetate is hydrolyzed to 2-chloro-9α-fluoro-17α,21-dihydroxy-4-pregnene-3,11,20-trione.

EXAMPLE 15

*2,9α-Difluoro-11β,17α,21-Trihydroxy-4-Pregnene-3,20-Dione 21-Propionate*

A solution was prepared containing fifty milligrams of 2,9α-difluoro-11β,17α,21 - trihydroxy - 4 - pregnene - 3,20-dione in one milliliter of pyridine and one milliliter of propionic anhydride. The solution was allowed to stand at room temperature for a period of 21 hours and was thereupon poured into ten milliliters of water. The reaction mixture was then extracted with three 10-milliliter portions of methylene chloride. The methylene chloride extracts were combined, washed with water, dried over anhydrous sodium sulfate and evaporated to give a residue of 2,9α-difluoro-11β,17α,21-trihydroxy-4-pregnene-3,20-dione 21-propionate. Similarly, 2,9α-difluoro-11β,17α,21-trihydroxy-4-pregnene-3,20-dione is converted to other 2,9α-difluoro-11β,17α,21 - trihydroxy - 4 - pregnene - 3,20-dione 21-acylates by esterification of the 21-hydroxy group, e.g., by reaction with the appropriate acid chloride or bromide, anhydride, ester under ester exchange conditions or acid under esterification conditions. Examples of these compounds thus prepared include those wherein the acyl radical of the 21-acylate group is that of an acid named in the paragraph following Preparation 5.

Similarly, 2-chloro-9α-fluoro-11β,17α,21-trihydroxy-4-pregnene-3,20-dione is converted to its 21-esters, and 2,9α-difluoro-17α,21-dihydroxy-4-pregnene - 3,11,20-trione and 2-chloro-9α-fluoro-17α,21 - dihydroxy - 4 - pregnene-3,11,20-trione are converted to their 21-esters, e.g., wherein the acyl radical of the ester group is that of an acid named in the paragraph following Preparation 5.

EXAMPLE 16

*2-Fluoro-11β-17α,21-Trihydroxy-4-Pregnene-3,20-Dione 21-Methanesulfonate*

A solution was prepared containing one gram (2.65 millimoles) of 2-fluoro-11β,17α,21-trihydroxy-4-pregnene-3,20-dione in seven milliliters of pyridine. This solution was cooled to zero degrees centigrade and treated with 0.3 milliliter of methanesulfonyl chloride. Thereafter the solution was allowed to stand at zero to five degrees centigrade for a period of two hours, after which it was diluted with water and extracted with three 25-milliliter portions of methylene chloride. The extracts were combined, washed with cold dilute hydrochloric acid until the aqueous layer had a pH of two to three, then washed again with cold sodium bicarbonate solution, water and finally dried over anhydrous sodium sulfate. Evaporation of the methylene chloride extract at reduced pressure left a residue of 2-fluoro-11β,17α,21-trihydroxy-4-pregnene-3,20-dione 21-methanesulfonate.

EXAMPLE 17

*2-Fluoro-11β,17α-Dihydroxy-21-Iodo-4-Pregnene-3,20-Dione*

The crude 2-fluoro-11β,17α,21-trihydroxy-4-pregnene-3,20-dione 21-methanesulfonate described in Example 16 was dissolved in fifteen milliliters of acetone and treated with a solution of one gram of sodium iodide in ten milliliters of acetone. The mixture was heated under reflux with stirring for a period of fifteen minutes, the heat then reduced and the mixture concentrated to one-third volume at reduced pressure. Ice and water were added and the precipitated product collected on a filter, washed with water and dried to yield 2-fluoro-11β,17α-dihydroxy-21-iodo-4-pregnene-3,20-dione.

EXAMPLE 18

*2,21-Difluoro-11β,17α-Dihydroxy-4-Pregnene-3,20-Dione*

One gram of 2-fluoro-11β,17α - dihydroxy - 21 - iodo-4-pregnene-3,20-dione was dissolved in 150 milliliters of boiling acetonitrile. After cooling to forty degrees centigrade, the solution was protected from light and 0.8 milliliter of a fifty percent aqueous solution of silver fluoride was added under stirring. Stirring was continued for one hour at about forty degrees centigrade, then 0.7 milliliter of silver fluoride solution was added. After another hour of stirring another 0.7 milliliter portion of aqueous silver fluoride solution was added. Heating and stirring was then continued for a period of two hours. The brown mixture was then filtered through a bed of diatomaceous earth (Celite) and the filtrate evaporated at reduced pressure at a bath temperature of fifty degrees centigrade. The brown residue was thoroughly extracted with two 100-milliliter portions of warm methylene chloride, the combined extracts washed with water and dried over anhydrous sodium sulfate. The dried solution was concentrated to approximately 100 milliliters and then chromatographed over fifty grams of magnesium silicate (Florisil). The column was eluted with hexanes containing increasing proportions of acetone to give 2,21-difluoro-11β,17α-dihydroxy-4-pregnene-3,20-dione.

In the same manner as given in Examples 16 to 18, 2,9α-difluoro-11β,17α,21-trihydroxy-4-pregnene-3,20-dione was converted to 2,9α,21-trifluoro-11β,17α-dihydroxy-4-pregnene-3,20-dione.

EXAMPLE 19

*2,21-Difluoro-11β,17α-Dihydroxy-4-Pregnene-3,20-Dione*

A solution of one gram of 2-fluoro-11β,17α-21-trihydroxy-4-pregnene-3,20-dione 21-methanesulfonate and 0.50 gram of anhydrous potassium fluoride in ten milliliters of dimethylsulfoxide was heated at 100 degrees centigrade for twelve hours. The cooled solution was diluted with water and then extracted with methylene chloride which was dried and chromatographed in the manner described in Example 18 to give substantially pure 2,21-difluoro-11β,17α-dihydroxy-4-pregnene-3,20-dione.

EXAMPLE 20

*2,21-Difluoro-17α-Hydroxy-4-Pregnene-3,11,20-Trione*

A solution was prepared containing 0.5 gram of 2,21-difluoro-11β,17α-dihydroxy-4-pregnene - 3,20 - dione, 0.15 gram of chromic acid, ten milliliters of glacial acetic acid and one-half milliliter of water. This mixture was stirred and then maintained for eight hours at room temperature. Thereafter the mixture was poured into fifty milliliters of ice water, neutralized by the addition of dilute sodium hydroxide and the thus-obtained precipitate collected on a filter and recrystallized three times from a mixture of ethyl acetate and Skellysolve B hexanes to give 2,21-difluoro-17α-hydroxy-4-pregnene-3,11,20-trione.

In the same manner given in Example 20, 2,9α,21-trifluoro - 11β,17α - dihydroxy - 4 - pregnene - 3,20 - dione was oxidized to 2,9α,21-trifluoro-17α-hydroxy-4-pregnene-3,11,20-trione.

EXAMPLE 21

*2-Fluoro-11β,17α-Dihydroxy-4-Pregnene-3,20-Dione*

150 milligrams of 2-fluoro-11β,17α-dihydroxy-21-iodo-4-pregnene-3,20-dione was slurried with five milliliters of acetic acid and stirred for a period of 45 minutes. Then an aqueous solution of 250 milligrams of sodium thiosulfate pentahydrate was added causing the iodine color to disappear. Additional water was added (fifty milliliters) and the mixture extracted with three 25-milliliter portions of methylene chloride. The methylene chloride extracts were combined, washed with water and cold sodium bicarbonate solution until all acetic acid was neutralized. After drying over anhydrous sodium sulfate, the solution was concentrated to approximately fifteen milliliters and chromatographed over ten grams of magnesium silicate (Florisil). The column was developed with hexanes containing increasing proportions of acetone, to give substantially pure 2-fluoro-11β,17α-dihydroxy-4-pregnene-3,20-dione.

Following the procedure of Example 21, 2,9α-difluoro-11β,17α - dihydroxy - 21 - iodo - 4 - pregnene - 3,20-dione was converted to 2,9α-difluoro-11β,17α-dihydroxy-4-pregnene-3,20-dione.

EXAMPLE 22

*2-Fluoro-17α-Hydroxy-4-Pregnene-3,11,20-Trione*

A mixture was prepared containing 0.3 gram of 2-fluoro-11β,17α-dihydroxy-4-pregnene-3,20-dione, 100 milligrams of chromic anhydride, ten milliliters of glacial acetic acid and one-half milliliter of water. This mixture was stirred and thereupon maintained for eight hours at room temperature. Thereafter the mixture was poured into fifty milliliters of ice water, neutralized by the addition of dilute sodium hydroxide and the thus-obtained precipitate collected on a filter and dried to give 2-fluoro-17α-hydroxy-4-pregnene-3,11,20-trione.

Following the procedure of Example 22, 2,9α-difluoro-11β,17α-dihydroxy-4-pregnene-3,20-dione was oxidized to 2,9α-difluoro-17α-hydroxy-4-pregnene-3,11,20-trione.

The above describes the production of steroids unmethylated at the 6-position. There now follows a description of the corresponding 6α-methyl steroids and processes for the preparation thereof.

This invention also relates to certain novel 2-halogenated-6α-methylated steroids and especially 2-fluoro-6α-methyl-11β,17α,21-trihydroxy-4-pregnene-3,20-dione and 21-esters thereof,
2,9α-difluoro-6α-methyl-11β,17α,21-trihydroxy-4-pregnene-3,20-dione and 21-esters thereof,
2-fluoro-6α-methyl-17α,21-dihydroxy-4-pregnene-3,11,20-trione and 21-esters thereof,
2,9α-difluoro-6α-methyl-17α,21-dihydroxy-4-pregnene-3,11,20-trione and 21-esters thereof,
2-fluoro-6α-methyl-11β,17α-dihydroxy-4-pregnene-3,20-dione,
2,9α-difluoro-6α-methyl-11β,17α-dihydroxy-4-pregnene-3,20-dione,
2-fluoro-6α-methyl-17α-hydroxy-4-pregnene-3,11,20-trione,
2,9α-difluoro-6α-methyl-17α-hydroxy-4-pregnene-3,11,20-trione,
2,21-difluoro-6α-methyl-11β,17α-dihydroxy-4-pregnene-3,20-dione,
2,9α,21-trifluoro-6α-methyl-11β,17α-dihydroxy-4-pregnene-3,20-dione,
2,21-difluoro-6α-methyl-17α-hydroxy-4-pregnene-3,11,20-trione, and
2,9α,21-trifluoro-6α-methyl-17α-hydroxy-4-pregnene-3,11,20-trione, intermediates in the production thereof, and to processes for their production.

The process of this invention for introducing a 2-fluorine atom in the 6α-methyl steroids, like that described above for steroids unmethylated at the 6-position, results in the introduction of the fluorine atom in the 2α-position. As will be described below, and as described above, fluorination by perchloryl fluoride of the 2-alkoxyoxalyl compound II to form compound III followed by removal of the alkoxyoxalyl group to produce IV results in the 2α-fluoro compounds. This 2α-configuration is retained throughout the subsequent chemical conversions described above and below in this specification, and the 2-fluorine atom of all the 2-fluoro compounds, methylated and unmethylated at the 6-position, of this invention has the α-stereoconfiguration.

The novel 2-fluoro-6α-methyl steroid compounds of the present invention and processes for their production may be represented by the following formulae:

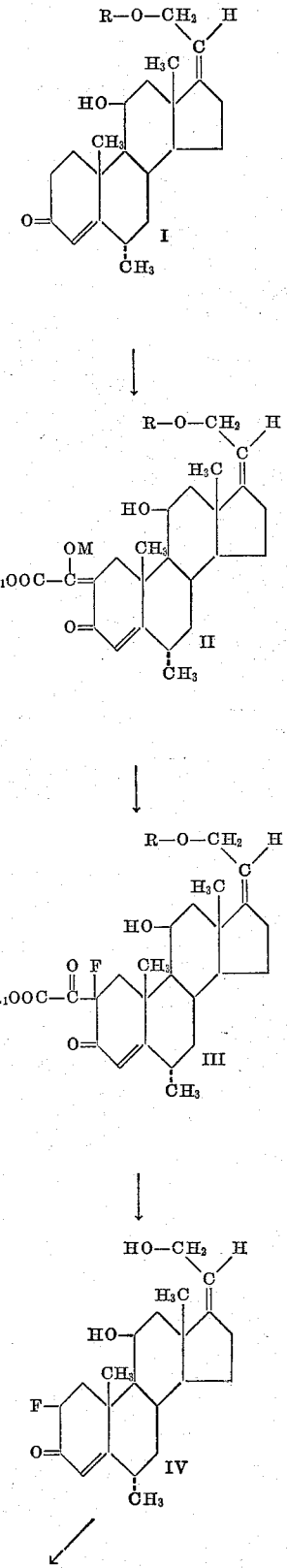

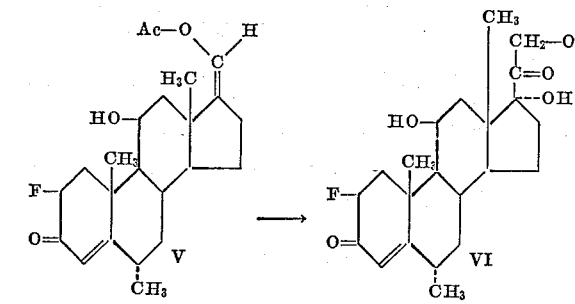
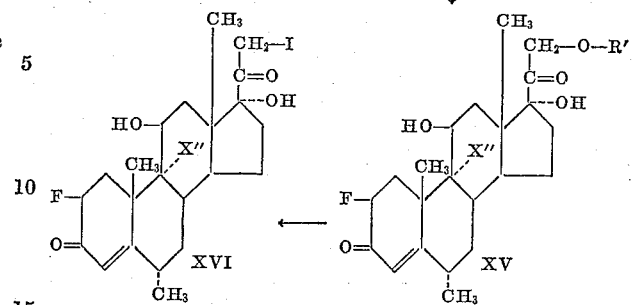
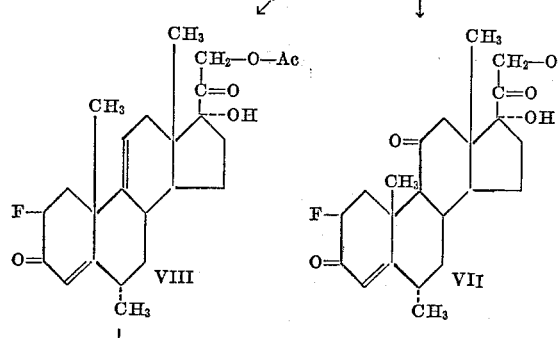
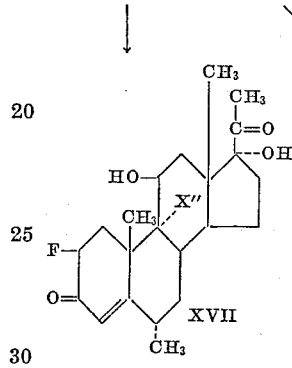
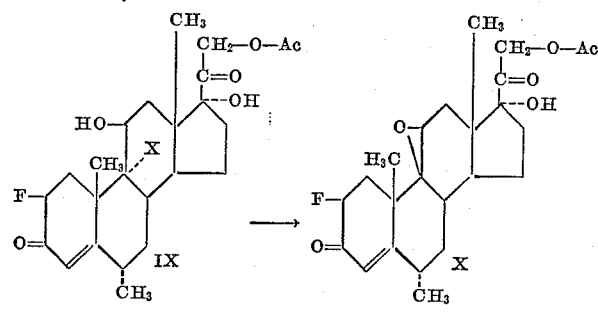
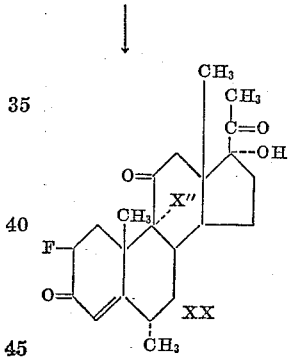
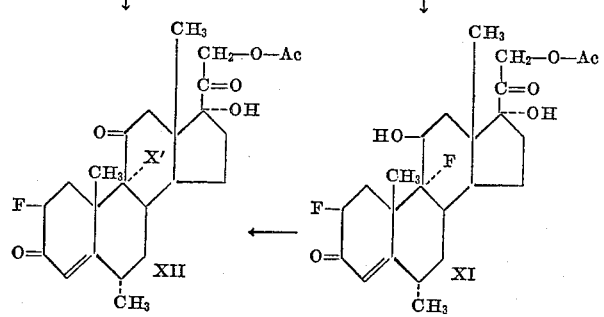
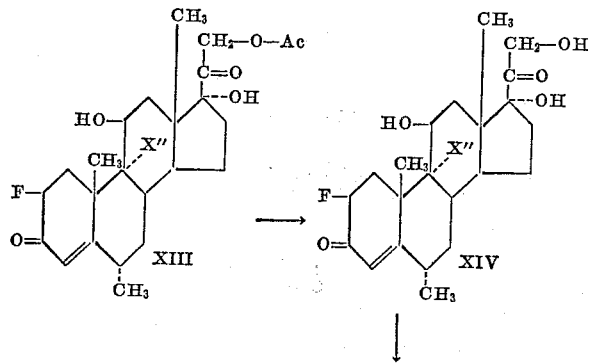

wherein X is a halogen atom having an atomic weight from 35 to 127, inclusive, i.e., chlorine, bromine or iodine, X' is a halogen atom, i.e., chlorine, fluorine, bromine or iodine, preferably fluorine, X'' is a hydrogen, chlorine or fluorine atom, M is hydrogen or an alkali-metal, R is hydrogen or Ac, Ac being the acyl radical of a hydrocarbon carboxylic acid containing from one to twelve carbon atoms, inclusive, $R_1$ is alkyl, preferably lower-alkyl, and R' is a sulfonyl radical, preferably that of a hydrocarbon sulfonic acid containing from one to twelve carbon atoms, inclusive, e.g., lower-alkyl-, methyl-, aryl-, phenyl-, p-tolyl-, sym.-xylyl-sulfonic acid.

According to the present invention, 6α-methyl-11β,21-dihydroxy-4,17(20)-[cis]-pregnadien-3-one (I, R=H), [Spero et al., J. Am. Chem. Soc., 78, 6213 (1956)] is reacted with a di-lower-alkyl oxalate, preferably methyl or ethyl oxalate, in the presence of an alkali-metal condensation catalyst, e.g., an alkali-metal alkoxide, an alkali metal, sodium, alkali-metal hydride, sodium amide, alkali-metal amide, and alkyl alkali metals, triphenylmethyl sodium, preferably an alkali-metal lower-alkoxide, preferably sodium methoxide, sodium ethoxide or potassium tertiary butoxide, in a solvent nonreactive under the reaction conditions, e.g., tertiary butyl alcohol, to produce an alkali-metal enolate of 2-alkoxyoxalyl-6α-methyl-11β,21-dihydroxy-4,17(20)-[cis]-pregnadien-3-one (II, M=alkali-metal). This compound or the corresponding free enol (II, M=H) is then reacted with perchloryl fluoride ($ClO_3F$) to produce 2-fluoro-2-alkoxyoxalyl-6α-methyl-11β,21-dihydroxy-4,17(20)-[cis]-pregnadien-3-one (III).

Treatment of this compound with base, e.g., methanolic sodium methoxide, is productive of 2-fluoro-6α-methyl-11β,21-dihydroxy-4,17(20)-[cis]-pregnadien-3-one (IV). Alternatively, starting with a 21-ester of 6α-methyl-11β,21-dihydroxy-4,17(20)-[cis]-pregnadien-3-one (I, R=Ac), preferably the acetate, the corresponding 2-alkoxyoxalyl compound (II, R=Ac) and the 2-fluoro-2-alkoxyoxalyl compound (III, R=Ac) are produced. Removal of the 2-alkoxyoxalyl group results in at least partial hydrolysis of the 21-ester group so that the 2-fluoro-21-hydroxy compound (IV, R=H) results. Esterification of this compound, preferably with acetic anhydride, reintroduces the 21-ester group (V, R=Ac). Oxidative hydroxylation of these compounds, preferably V, according to one of the methods described in U.S. Patents 2,769,825, 2,769,823 or in Hogg et al., J. Am. Chem. Soc., 77, 4436 (1955), is productive of 2-fluoro-6α-methyl-11β,17α,21-trihydroxy-4-pregnene-3,20-dione 21-acylate, preferably the 21-acetate, (VI, X=F) which can be hydrolyzed with base to produce 2-fluoro-6α-methyl-11β,17α,21-trihydroxy-4-pregnene-3,20-dione (XIV, X=H) or oxidized with an oxidizing agent, e.g., chromic acid or a N-haloacylamide, e.g., N-bromoacetamide, or a N-haloimide, e.g., N-chlorosuccinimide, in pyridine or other like amine, to produce the corresponding ester of 2-fluoro-6α-methyl-17α,21-dihydroxy-4-pregnene-3,11,20-trione (VII), which, in turn, is hydrolyzed as described above to 2-fluoro - 6 α- methyl - 17α,21 - dihydroxy - 4 - pregnene-3,11,20-trione.

The 2,9α-dihalo-6α-methyl compounds of the present invention are prepared as follows: dehydrating a 2-fluoro-6α - methyl - 11β,17α,21 - trihydroxy - 4 - pregnene - 3,20-dione 21-acylate (VI), illustratively with sulfuric acid or by producing an 11-sulfonic acid ester, e.g., tolyl, and dehydrating according to methods known in the art, or preferably with a hypohalous acid followed by anhydrous sulfur dioxide, produces the corresponding 2-fluoro-6α-methyl - 17α,21 - dihydroxy - 4,9(11) - pregnadiene-3,20-dione 21-acylate (VIII). Addition of a hypohalous acid, i.e., hypochlorous, hypoiodous or hypobromous acid, to this latter compound produces the corresponding 2-fluoro - 6α - methyl -9 α - halo - 11β,17α,21 - trihydroxy-4-pregnene-3,20-dione 21-acylate (IX), which by treatment with a base, e.g., anhydrous potassium acetate, yields the corresponding expoxy compound (X), e.g., 2-fluoro-6α - methyl - 9β,11β - epoxy - 17α,21 - dihydroxy - 4 - pregnene-3,20-dione 21-acylate. Treatment of this epoxy compound with hydrogen fluoride or a hydrogen fluoride releasing agent produces the highly active 2,9α-difluoro-6α-methyl-11β,17α,21-trihydroxy-4-pregene-3,20-dione 21-acylate (XI). Oxidation of this latter compound, preferably the 21-acetate, with chromic acid in acetic acid provides 2,9α - difluoro - 6α - methyl - 17α,21 - dihydroxy-4-pregnene-3,11,20-trione 21-acyltae (XII). Hydrolysis of the ester XII with a base provides the free alcohol 2,9α - difluoro - 6α - methyl - 17α,21 - dihydroxy-4-pregnene-3,11,20-trione.

The 2,21-difluoro-6α-methyl compounds of the present invention are prepared by treating 2-fluoro-6α-methyl-11β,17a,21-trihydroxy-4-pregnene-3,20-dione (XIV) or the corresponding 11-keto compound or their 9α-fluoro analogues (XIV) with an organic sulfonyl halide such as methanesulfonyl chloride, toluenesulfonyl chloride, toluenesulfonyl bromide, benzenesulfonyl chloride, naphthylsulfonyl chloride, or the like, according to methods known in the art, to obtain the corresponding 21-sulfonate ester (XV), e.g., 2-fluoro-6α-methyl-11β,17α,21-trihydroxy-4-pregnene-3,20-dione 21-methylsulfonate or 21-p-toluenesulfonate; treating the thus-produced 21-alkyl or aryl sulfonate with sodium iodide in acetone solution to obtain the corresponding 21-iodo compound, e.g., 2-fluoro-6α-methyl - 11β,17α - dihydroxy - 21 - iodo - 4 - pregnene-3,20-dione (XVI); treating the thus-obtained 21-iodo compound with silver fluoride, preferably in acetonitrile solution to obtain the corresponding 21-fluoro compound, e.g., 2,21-difluoro-6α-methyl-11β,17α-dihydroxy-4-pregnene-3,20-dione (XVIII); and if desired oxidizing the thus-obtained 21-fluoro compound with chromic anhydride, N-bromoacetamide, N-bromosuccinimide, or the like, to give the corresponding 11-keto compound, e.g., 2 - 21 - difluoro - 6α - methyl - 17α - hydroxy - 4 - pregnene-3-11,20-trione (XIX). Alternatively, the 21-sulfonate, preferably the 21-methylsulfonate, can be treated directly with sodium or potassuim fluoride in dimethyl sulfoxide, e.g., at 100 degrees for eighteen hours or longer, to produce 2,21 - difluoro - 6α - methyl - 11β,17a - dihydroxy-4-pregnene-3,20-dione directly. The 11-keto analogues of these compounds are similarly converted from their 21-sulfonate ester directly to the 21-fluoro compounds.

The 21-unsubstituted-6α-methyl compounds of the present invention (XVII, XX), e.g., 2-fluoro-6α-methyl-11β,17α-dihydroxy-4-pregnene-3,20-dione, are prepared by treating a 21-iodo compound (XVI), e.g., 2-fluoro-6α-methyl-11β,17α-dihydroxy-21-iodo-4-pregnene - 3,20-dione with a reducing agent such as sodium thiosulfate, sodium bisulfite, potassium bisulfite, or the like, in an aqueous organic solvent mixture to obtain the corresponding 21-unsubstituted compound (XVII) and if desired oxidizing the thus-obtained 2-fluoro-6α-methyl-11β,17α-dihydroxy-4-pregnene-3,20-dione with chromic anhydride, N-bromoacetamide, N-bromosuccinimide, or other oxidizing agent, to give the corresponding 11-keto compound (XX), e.g., 2-fluoro-6α-methyl - 17α - hydroxy - 4 - pregnene-3,11,20-trione. The 9α-halo-21-unsubstituted compounds (XVII, XX, X″=Cl, F) are prepared by substituting the corresponding 9α-halo-21-iodo compounds (XVI, X″=Cl, F) as starting compounds in the above-described reaction, or by introducing the 9α-halogen into the corresponding 9-hydrogen compounds in the manner described hereinbefore.

It is an object of this invention to provide the novel 2-fluoro-6α-methyl-11β,17α,21-trihydroxy-4-pregnene - 3,20-dione and 21-esters thereof, 2,9α-difluoro - 6α - methyl-11β,17α,21-trihydroxy-4-pregnene-3,20-dione, esters thereof and the 9α-chloro, 9α-bromo, and 9α-iodo analogues thereof that are intermediates in the production of the 9α-fluoro compound, as well as the 9(11)-dehydro and 9β,11β-epoxy intermediates in the production of the 9α-fluoro compound, 2-fluoro-6α-methyl-17α,21-dihydroxy-4-pregnene-3,11,20-trione and 21-esters thereof, 2,9α-difluoro-6α-methyl-17α,21-dihydroxy - 4 - pregnene-3,11,20-trione and 21-esters thereof, as well as the 9α-chloro, 9α-bromo, and 9α-iodo analogues thereof, 2-fluoro-6α-methyl-11β,17α-dihydroxy-4-pregnene-3,20-dione, 2,9α - difluoro-6α-methyl-11β,17α-dihydroxy-4-pregnene - 3,20-dione and intermediates in the production thereof, including the corresponding 9α-chloro compounds, 2-fluoro-6α-methyl-17α-hydroxy - 4 - pregnene - 3,11,20 - trione, 2,9α - difluoro-6α-methyl-17α-hydroxy-4-pregnene-3,11,20-trione, 2,21-difluoro-6α-methyl-11β,17α - dihydroxy-4-pregnene-3,20-dione, 2,9α,21-trifluoro-6α - methyl - 11β,17α - dihydroxy-4-pregnene-3,20-dione, and interrmediates in the production thereof, 2,21-difluoro-6α-methyl-17α-hydroxy-4-pregnene-3,11,20-trione, 2,9α,21-trifluoro-6α-methyl-17α-hydroxy-4-pregnene-3,11,20-trione and intermediates in the production thereof, including the 9α-chloro compounds corresponding to each of the above compounds. It is another object to provide processes for the production thereof and pharmaceutical preparations and mixtures thereof. Other objects will be apparent to those skilled in the art to which this invention pertains.

The novel 2-fluoro-6α-methyl compounds of this invention (VI-XX) possess a high order of physiological activities, and possess activity spectra different from the adrenocortical hormones found in nature such as hydrocortisone and cortisone or other known compounds without the 2-fluoro group especially in their effect on mineral and water-metabolism. These compounds, especially VI, VII, XI, XII, XIV, XVII, XVIII, XIX and XX, possess useful anti-inflammatory activity. These compounds cause less salt and water retention than the corresponding analogues without the 2-fluoro group, which makes them especially valuable in the management of inflammatory conditions concurrent with chronic congestive heart failure, of cirrhosis of the liver, the nephrotic syndrome and eclampsia and preeclampsia.

The novel 2-fluoro-6α-methyl compounds of this invention are useful in oral, parenteral and topical compositions. In oral compositions the material may be given as tablets illustratively using either polyethylene glycol 4000 or 6000 as a carrier or lactose and/or sucrose as a dilutent. They are useful for topical application as ointments, lotions, jellies, creams, suppositories, bougies, aqueous suspensions, etc.

Incorporation of an antibiotic into the pharmaceutical composition, especially neomycin sulfate, has therapeutic advantages each active ingredient potentiating and supplementing the useful properties of the other. In place of, or in addition to, neomycin sulfate, other antibiotics such as novobiocin, bacitracin, circulin, polymyxin B sulfate, gramicidin, streptomycin sulfate, dihydrostreptomycin sulfate, oxytetracycline, chlortetracycline, tetracycline, chloramphenicol and the sulfonamides can be used in conjunction with the steroids of the present invention for preparations such as the above ointments.

The following examples are illustrative of the process and 2-fluoro-6α-methyl products of the present invention, but are not to be construed as limiting.

EXAMPLE 23

2-Fluoro-6α-Methyl-11β,21-Dihydroxy-4,17(20) [Cis]-Pregnadien-3-One

A solution of 7.73 grams of 6α-methyl-11β,21-dihydroxy-4,17(20)-[cis]-pregnadien-3-one 21-acetate [Spero, et al., J. Am. Chem. Soc., 78, 6213 (1956)], in 100 milliliters of tertiary butyl alcohol was stirred and heated to sixty degrees centigrade under a nitrogen atmosphere. Heating was stopped and 5.45 milliliters of ethyl oxalate and 6.67 milliliters of a methanol solution containing 1.6 grams of sodium methoxide was added. After stirring for one-half hour, 100 milliliters of ether was added. The yellow precipitate was collected, washed with ether and dried. There was obtained 10.20 grams.

The precipitate was dissolved in 120 milliliters of methanol and the solution cooled to zero degrees centigrade. An ice cold solution of 3.34 grams of perchloryl fluoride ($ClO_3F$) in 100 milliliters of methanol was added to the stirred solution under nitrogen while maintaining the reaction temperature between minus five and minus fifteen degrees centigrade. After all the perchloryl fluoride was added, stirring was continued for one-half hour, 7.35 milliliters of 25 percent sodium methoxide was added, stirring continued at the same temperature for another 45 minutes and the mixture was then concentrated at reduced pressure. The residue was mixed with a liter of ice water. The white solid that precipitated was triturated throughly with water and then dried in a vacuum desiccator. There were obtained 6.1 grams which were dissolved in methylene chloride and poured over a 250-gram column of magnesium silicate (Florisil). The column was developed with 125-milliliter portions of solvent of the following composition and order: eight of hexane hydrocarbons plus seven percent acetone, four of hexane hydrocarbons plus ten percent acetone, five of hexane hydrocarbons plus twenty percent acetone, and finally one of acetone. Fractions thirteen to sixteen eluted 4.537 grams of 2-fluoro-6α-methyl-11β,21-dihydroxy-4,17(20)-[cis]-pregnadien-3-one, melting at 145 to 155 degrees centigrade. One crystallization from ethyl acetate raised the melting point to 166 to 168 degrees centigrade. A sample recrystallized once more from ethyl acetate melted at 188 to 189 degrees centigrade and had the analysis below.

Calculated for $C_{22}H_{31}FO_3$: C, 72.86; H, 8.62; F, 5.24. Found: C, 72.73; H, 8.61; F, 5.14.

EXAMPLE 24

2-Fluoro-6α-Methyl-11β,21-Dihydroxy-4,17(20)- [Cis]-Pregnadien-3-One 21-Acetate

A solution of 3.338 grams of 2-fluoro-6α-methyl-11β, 21-dihydroxy-4,17(20)-[cis]-pregnadien-3-one in about twenty milliliters of pyridine and 28 milliliters of acetic anhydride was maintained at room temperature for about sixteen hours. The solution was poured into water to give an amorphous solid which was crystallized from tertiary butyl alcohol to give 2-fluoro-6α-methyl-11β,21-dihydroxy-4,17(20)-[cis]-pregnadien-3-one 21-acetate melting at 147 to 156 degrees centigrade.

Similarly, 2-fluoro - 6α - methyl - 11β,21-dihydroxy-4, 17(20)-[cis]-pregnadien-3-one is converted to other 2-fluoro-6α-methyl - 11β,21-dihydroxy - 4,17(20) - [cis]- pregnadien-3-one 21-acelates by esterification of the 21-hydroxy group, e.g., by reaction with the appropriate acid anhydride, in the presence of a base, e.g., collidine, pyridine or sodium acetate. Examples of 2-fluoro-6α-methyl-11β,21-dihydroxy - 4,17(20) - [cis] - pregnadien-3-one 21-acylates which can be prepared include those wherein the acyl radical of the 21-acylate group is that of, for example, a lower-alphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylidene-acetic, cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenboic, α-naphthoic, 3-methyl-α-naphthoic, an aralkyl acid, e.g., phenylacetic, phenylpropionic, diphenylacetic, triphenylacetic, etc.

EXAMPLE 25

2-Fluoro-6α-Methyl-11β,17α,21-Trihydroxy- 4-Pregnene-3,20-Dione 21-Acetate

A solution of 1.84 grams of 2-fluoro-6α-methyl-11β,21-dihydroxy-4,17(20)-[cis]-pregnadien - 3 - one 21-acetate in seventy milliliters of tertiary butyl alcohol and 2.15 milliliters of pyridine was mixed with 2.77 milligrams of osmium tetroxide in 0.94 milliliter of tertiary butyl alcohol and 698 milligrams of N-methylmorpholine oxide peroxide (U.S. Patent 2,769,823) in 6.05 milliliters of tertiary butyl alcohol and then stirred for sixteen hours at room temperature. One gram of filter aid (Magnesol) and seventeen milliliters of a 0.5 percent aqueous sodium hydrosulfite solution was added and the mixture filtered, diluted with water and extracted with ether. The ether solution was washed with water, dilute hydrochloric acid and an aqueous sodium chloride solution, dried over sodium sulfate and the solvent then evaporated. The residual oil was dissolved in methylene chloride and chromatographed over a 130-gram column of magnesium silicate (Florisil). The desired product was eluted with fifteen and twenty percent acetone in hexanes (Skellysolve B). The 1.305 grams of 2-fluoro-6α-methyl-11β, 17α,21-trihydroxy-4-pregnene-3,20-dione 21-acetate thus obtained was amorphous and could not be crystallized 2-fluoro-6α-methyl-11β,17α,21 - trihydroxy - 4 - pregnene-3,20-dione 21-acetate has a $\lambda_{max.}$ of 242 mμ, $a_M$ 13,280.

Following the procedure described above, other 21-esters of 2-fluoro-6α-methyl-11β,21-dihydroxy-4,17(20)- [cis]-pregnadien-3-one, e.g., the esters described in the paragraph following Example 2, are converted to the corresponding 21-esters of a 2-fluoro-6α-methyl-11β,17α,21-trihydroxy-4-pregnene-3,20-dione. Similarly, 2-fluoro-6α-methyl - 11β,21 - dihydroxy-4,17(20) - [cis]-pregnadien-3-one is converted to 2-fluoro-6α-methyl-11β,17α,21-trihydroxy-4-pregnene-3,20-dione.

EXAMPLE 26

2-Fluoro-6α-Methyl-17α,21-Dihydroxy-4-Pregnene-3,11,20-Trione 21-Acetate

A solution of one gram of sodium dichromate dihydrate in twenty milliliters of acetic acid was cooled to room temperature and then mixed with a solution of 1.45 grams of crude 2-fluoro-6α-methyl-11β,17α,21-trihydroxy-4-pregnene-3,20-dione 21-acetate in twenty milliliters of acetic acid. The mixture was maintained for one hour and then extracted with methylene chloride. The extracts were washed successively with aqueous sodium sulfite, aqueous sodium bicarbonate and then with water, dried over sodium sulfate and the solvent then evaporated. The residue was crystallized from methanol to give 0.4 gram 2-fluoro-6α-methyl-17α,21-dihydroxy-4-pregnene-3,11,20-trione 21-acetate melting at 222 to 225 degrees centigrade with sintering at 207 degrees, having an $[\alpha]_D$ of plus 216 degrees in chloroform and the analysis below.

Calculated for $C_{24}H_{31}FO_6$: C, 66.34; H, 7.19. Found: C, 66.94; H, 7.24.

EXAMPLE 27

2-Fluoro-6α-Methyl-11β,17α,21-Trihydroxy-4-Pregnene-3,20-Dione

A solution of 438 milligrams of 2-fluoro-6α-methyl-11β,17α,21 - trihydroxy - 4 - pregnene - 3,20 - dione 21-acetate in four milliliters of methanol was freed of oxygen by bubbling nitrogen through it. A solution of 404 milligrams of potassium bicarbonate in four milliliters of water was similarly freed of oxygen. The two solutions were mixed at a temperature of between eighteen and twenty degrees centigrade and in a nitrogen atmosphere. The mixture was stirred at room temperature for five hours while protecting it from atmospheric oxygen with nitrogen. At the end of this time the solution was neutralized with glacial acetic acid. The neutral solution was concentrated by distillation at room temperature and reduced pressure and then chilled in a refrigerator for sixteen hours. The precipitated 2-fluoro-6α-methyl-11β,17α,21-trihydroxy-4-pregnene-3,20-dione was filtered and dried.

EXAMPLE 28

2-Fluoro-6α-Methyl-17α,21-Dihydroxy-4-Pregnene-3,11,20-Trione

Following the procedure of Example 27, 2-fluoro-6α-methyl - 17α,21 - dihydroxy - 4 - pregnene-3,11,20-trione 21-acetate was hydrolyzed to 2-fluoro-6α-methyl-17α,21-dihydroxy-4-pregnene-3,11,20-trione.

EXAMPLE 29

2-Fluoro-6α-Methyl-17α,21-Dihydroxy-4,9(11)-Pregnadiene-3,20-Dione 21-Acetate To a solution of 530 milligrams of 2-fluoro-6α-methyl-11β,17α,21 - trihydroxy - 4 - pregnene - 3,20 - dione 21-acetate in five milliliters of pyridine, in a nitrogen atmosphere, was added 225 milligrams of N-bromoacetamide. After standing at room temperature under nitrogen for a period of thirty minutes, the reaction solution was cooled to ten to fifteen degrees centigrade and, with shaking, sulfur dioxide gas was passed over the surface until the solution gave no color with acidified starch-iodine paper. During the addition of sulfur dioxide gas, the reaction became warm. The temperature was kept under thirty degrees centigrade by external cooling and by varying the rate of sulfur dioxide addition. After standing at room temperature for a period of fifteen minutes, the reaction mixture was poured into thirty milliliters of ice water and the resulting gummy precipitate extracted with fifty milliliters of ether. The ether extract was washed with five percent hydrochloric acid solution and water, dried over anhydrous sodium sulfate, and evaporated to dryness to give 2-fluoro-6α-methyl-17α,21-dihydroxy-4,9(11)-pregnadiene-3,20-dione 21-acetate.

EXAMPLE 30

2-Fluoro-6α-Methyl-9α-Bromo-11β,17α,21-Trihydroxy-4-Pregnene-3,20-Dione 21-Acetate To a solution of 332 milligrams of 2-fluoro-6α-methyl-17α,21 - dihydroxy - 4,9(11) - pregnadiene - 3,20 - dione 21-acetate in five milliliters of methylene chloride and 9.9 milliliters of tertiary butyl alcohol was added a solution of 0.83 milliliter of 72 percent perchloric acid in 5.8 milliliters of water followed by a solution of 142 milligrams of N-bromoacetamide in 2.5 milliliters of tertiary butyl alcohol. After stirring the reaction mixture for fifteen minutes, a solution of 142 milligrams of sodium sulfite in seven milliliters of water was added and the reaction mixture was concentrated to a volume of about 25 milliliters under reduced pressure at about sixty degrees centigrade. The concentrate was cooled in an ice bath while stirring and 35 milliliters of water was added. After stirring for a period of twenty minutes, the crystalline product was isolated by filtration, the crystals were washed with water and air-dried to give 2-fluoro-6α-methyl - 9α - bromo - 11β,17α,21 - trihydroxy - 4 - pregnene-3,20-dione 21-acetate.

In the same manner as shown in Example 30, 2-fluoro-6α - methyl - 17α,21 - dihydroxy - 4,9(11) - pregnadiene-3,20-dione 21-acetate was reacted with N-chlorosuccinimide in the presence of aqueous perchloric acid to produce a 2 - fluoro - 6α - methyl - 9α - chloro - 11β,17α,21-trihydroxy-4-pregnene-3,20-dione 21-acetate.

EXAMPLE 31

2-Fluoro-6α-Methyl-9β,11β-Epoxy-17α,21-Dihydroxy-4-Pregnene-3,20-Dione 21-Acetate To a solution of 406 milligrams of 2-fluoro-6α-methyl-9α - bromo - 11β,17α,21 - trihydroxy - 4 - pregnene - 3,20-dione 21-acetate in fifteen milliliters of acetone was added 406 milligrams of potassium acetate and the resulting suspension was heated under reflux for a period of eighteen hours. The mixture was then concentrated to a volume of five milliliters on the steam bath and thereupon ten milliliters of water was added. The product was separated by filtration and recrystallized from acetone to give 2-fluoro-6α-methyl-9β,11β-epoxy-17α,21-dihydroxy-4-pregnene-3,20-dione 21-acetate.

EXAMPLE 32

2,9α-Difluoro-6α-Methyl-11β,17α,21-Trihydroxy-4-Pregnene-3,20-Dione 21-Acetate To a solution of 230 milligrams of 2-fluoro-6α-methyl-9β,11β - epoxy - 17α,21 - dihydroxy - 4 - pregnene - 3,20-dione 21-acetate in five milliliters of methylene chloride was added 1.2 milliliters of a 48 percent aqueous solution of hydrogen fluoride. The two-phase mixture was stirred for a period of twenty hours, then diluted with fifteen milliliters of methylene chloride and carefully poured into forty milliliters of water containing four grams of sodium bicarbonate. After shaking to neutralize the excess hydrogen fluoride, the methylene chloride was separated and the water phase was extracted with more methylene chloride. The combined methylene chloride solution was dried over anhydrous sodium sulfate, diluted with 25 milliliters of ether and chromatographed over twenty grams of magnesium silicate (Florisil). The column was eluted with hexanes (Skellysolve B) containing increasing proportions of acetone to give substantially pure 2,9α-difluoro - 6α - methyl - 11β,17α,21 - trihydroxy - 4 - pregnene-3,20-dione 21-acetate.

EXAMPLE 33

2,9α-Difluoro-6α-Methyl-17α,21-Dihydroxy-4-Pregnene-3,11,20-Trione 21-Acetate A solution of fifty milligrams of 2,9α-difluoro-6α-methyl - 11β,17α,21 - trihydroxy - 4 - pregnene - 3,20 - dione 21-acetate, twenty milligrams of chromic anhydride and one drop of water in one milliliter of acetic acid was shaken several times at room temperature and allowed to stand for four hours. Thereafter it was poured into ten milliliters of water and then extracted with methylene chloride. The extracts were dried with sodium sulfate and then evaporated to dryness to give a residue consisting essentially of 2,9α-difluoro-6α-methyl-17α,21-dihydroxy-4-pregnene-3,11,20-trione 21-acetate.

EXAMPLE 34

*2,9α-Difluoro-6α-Methyl-11β,17α,21-Trihydroxy-4-Pregnene-3,20-Dione*

100 milligrams of 2,9α-difluoro-6α-methyl-11β,17α,21-trihydroxy - 4 - pregnene - 3,20 - dione 21 - acetate were dissolved in a solution consisting of two milliliters of methanol and 0.1 milliliter of water, previously purged of air-oxygen by passing nitrogen through it, and to the resulting solution was added fifty milligrams of potassium carbonate. The mixture was allowed to stand at room temperature for period of six hours in a nitrogen atmosphere, and then neutralized with acetic acid, diluted with five milliliters of water and refrigerated. The mixture was then filtered and the solids recrystallized from aceton-Skellysolve B hexanes to give pure 2,9α-difluoro-6α-methyl - 11β,17α,21 - trihydroxy - 4 - pregnene - 3,20-dione.

In the manner given in Example 34, hydrolyzing 2,9α-difluoro - 6α - methyl - 17α,21 - dihydroxy - 4 - pregnene-3,11,20-trione 21-acetate with potassium carbonate in methanol yielded 2,9α-difluoro-16α-methyl-17α,21-dihydroxy-4-pregnene-3,11,20-trione.

EXAMPLE 35

*2,9α-Difluoro-6α-Methyl-11β,17α,21-Trihydroxy-4-Pregnene-3,20-Dione 21-Propionate*

A solution was prepared containing fifty milligrams of 2,9α - difluoro - 6α - methyl - 11β,17α,21 - trihydroxy-4-pregnene-3,20-dione in one milliliter of pyridine and one milliliter of propionic anhydride. The solution was allowed to stand at room temperature for a period of 21 hours and was thereupon poured into ten milliliters of water. The reaction mixture was then extracted with three ten-milliliter portions of methylene chloride. The methylene chloride extracts were combined, washed with water, dried over anhydrous sodium sulfate and evaporated to give a residue of 2,9α-difluoro-6α-methyl-11β,17α,21 - trihydroxy - 4 - pregnene - 3,20 - dione 21 - propionate. Similarly, 2,9α - difluoro - 6α - methyl - 11β,17α,21-trihydroxy-4-pregnene-3,20-dione is converted to other 2,9α - difluoro - 11β,17α,21 - trihydroxy-4-pregnene-3,20-dione 21-acylates by esterification of the 21-hydroxy group, e.g., by reaction with the appropriate acid chloride or bromide, anhydride, ester under ester exchange conditions or acid under esterification conditions. Examples of these compounds thus prepared include those wherein the acyl radical of the 21-acylate group is that of an acid named in the paragraph following Example 24.

Similarly, 2,9α - difluoro-6α-methyl-17α,21-dihydroxy-4-pregnene-3,11,20-trione is converted to its 21-esters, e.g., wherein the acyl radical of the ester group is that of an acid named in the paragraph following Example 24.

EXAMPLE 36

*2-Fluoro-6α-Methyl-11β,17α,21-Trihydroxy-4-Pregnene-3,20-Dione 21-Methanesulfonate*

A solution was prepared containing one gram (2.5 millimoles) of 2-fluoro-6α-methyl-11β,17α,21-trihydroxy-4-pregnene-3,20-dione in seven milliliters of pyridine. This solution was cooled to zero degrees centigrade and treated with 0.3 milliliter of methanesulfonyl chloride. Thereafter the solution was allowed to stand at zero to five degrees centigrade for a period of two hours, after which it was diluted with water and extracted with three 25-milliliter portions of methylene chloride. The extracts were combined, washed with cold dilute hydrochloric acid until the aqueous layer has a pH of two to three, then washed again with cold sodium bicarbonate solution, water and finally dried over anhydrous sodium sulfate. Evaporation of the methylene chloride extract at reduced pressure left a residue of 2-fluoro-6α-methyl-11β,17α,21-trihydroxy-4-pregnene-3,20-dione 21-methanesulfonate.

EXAMPLE 37

*2-Fluoro-6α-Methyl-11β,17α-Dihydroxy-21-Iodo-4-Pregnene-3,20-Dione*

The crude 2-fluoro-6α-methyl-11β,17α,21-trihydroxy-4-pregnene-3,20-dione 21-methanesulfonate described in Example 14 was dissolved in fifteen milliliters of acetone and treated with a solution of one gram of sodium iodide in ten milliliters of acetone. The mixture was heated under reflux with stirring for a period of fifteen minutes, the heat then reduced and the mixture concentrated to one-third volume at reduced pressure. Ice and water were added and the precipitated product collected on a filter, washed with water and dried to yield 2-fluoro-6α-methyl-11β,17α-dihydroxy-21-iodo-4-pregnene-3,20-dione.

EXAMPLE 38

*2,21-Difluoro-6α-Methyl-11β,17α-Dihydroxy-4-Pregnene-3,20-Dione*

One gram of 2-fluoro-6α-methyl-11β,17α-dihydroxy-21-iodo-4-pregnene-3,20-dione was dissolved in 150 milliliters of boiling acetonitrile. After cooling to forty degrees centigrade, the solution was protected from light and 0.8 milliliter of a fifty percent aqueous solution of silver fluoride was added under stirring. Stirring was continued for one hour at about forty degrees centigrade, then 0.7 milliliter of silver fluoride solution was added. After another hour of stirring another 0.7 milliliter portion of aqueous silver fluoride solution was added. Heating and stirring was then continued for a period of two hours. The brown mixture was then filtered through a bed of diatomaceous earth (Celite) and the filtrate evaporated at reduced pressure at a bath temperature of fifty degrees centigrade. The brown residue was thoroughly extracted with two 100-milliliter portions of warm methylene chloride, the combined extracts washed with water and dried over anhydrous sodium sulfate. The dried solution was concentrated to approximately 100 milliliters and then chromatographed over fifty grams of magnesium silicate (Florisil). The column was eluted with hexanes containing increasing proportions of acetone to give 2,21 - difluoro - 6α - methyl - 11β,17α - dihydroxy-4-pregnene-3,20-dione.

In the same manner as given in Examples 36 to 38, 2,9α - difluoro - 6α - methyl - 11β,17α,21 - trihydroxy-4-pregnene-3,20-dione was converted to 2,9α,21-trifluoro-6α-methyl-11β,17α-dihydroxy-4-pregnene-3,20-dione.

EXAMPLE 39

*2,21-Difluoro-6α-Methyl-11β,17α-Dihydroxy-4-Pregnene-3,20-Dione*

A solution of one gram of 2-fluoro-6α-methyl-11β,17α, 21 - trihydroxy - 4 - pregnene - 3,20 - dione 21 - methanesulfonate and 0.50 gram of anhydrous potassium fluoride in ten milliliters of dimethylsulfoxide was heated at 100 degrees centigrade for twelve hours. The cooled solution was diluted with water and then extracted with methylene chloride which was dried and chromatographed in the manner described in Example 38 to give substantially pure 2,21-difluoro-6α-methyl-11β,17α-dihydroxy-4-pregnene-3,20-dione.

EXAMPLE 40

*2,21-Difluoro-6α-Methyl-17α-Hydroxy-4-Pregnene-3,11,20-Trione*

A solution was prepared containing 0.5 gram of 2,21-difluoro - 6α - methyl - 11β,17α - dihydroxy - 4 - pregnene- 3,20-dione, 0.15 gram of chromic acid, ten milliliters of glacial acetic acid and one-half milliliter of water. This mixture was stirred and then maintained for eight hours at room temperature. Thereafter the mixture was poured into fifty milliliters of ice water, neutralized by the addition of dilute sodium hydroxide and the thus-obtained precipitate collected on a filter and recrystallized three times from a mixture of ethyl acetate and Skellysolve B hexanes to give 2,21-difluoro-6α-methyl-17α-hydroxy-4-pregnene-3,11,20-trione.

In the same manner given in Example 40, 2,9α,21-trifluoro - 6α - methyl - 11β,17α - dihydroxy - 4 - pregnene-3,20-dione was oxidized to 2,9α,21-trifluoro-6α-methyl-17α-hydroxy-4-pregnene-3,11,20-trione.

EXAMPLE 41

2-Fluoro-6α-Methyl-11β,17α-Dihydroxy-4-Pregnene-3,20-Dione 150 milligrams of 2-fluoro-6α-methyl-11β,17α-dihydroxy-21-iodo-4-pregnene-3,20-dione was slurred with five milliliters of acetic acid and stirred for a period of 45 minutes. Then an aqueous solution of 250 milligrams of sodium thiosulfate pentahydrate was added causing the iodine color to disappear. Additional water was added (fifty milliliters) and the mixture extracted with three 25-milliliter portions of methylene chloride. The methylene chloride extracts were combined, washed with water and cold sodium bicarbonate solution until all acetic acid was neutralized. After drying over anhydrous sodium sulfate, the solution was concentrated to approximately fifteen milliliters and chromatographed over ten grams of magnesium silicate (Florisil). The column was developed with hexanes containing increasing proportions of acetone, to give substantially pure 2-fluoro-6α-methyl-11β,17α-dihydroxy-4-pregnene-3,20-dione.

Following the procedure of Example 41, 2,9α-difluoro-6α-methyl-11β,17α-dihydroxy-21-iodo-4-pregnane-3,20-dione was converted to 2,9α-difluoro-6α-methyl-11β,17α-dihydroxy-4-pregnene-3,20-dione.

EXAMPLE 42

2-Fluoro-6α-Methyl-17α-Hydroxy-4-Pregnene-3,11,20-Trione

A mixture was prepared containing 0.3 gram of 2-fluoro-6α-methyl-11β,17α-dihydroxy-4-pregnene-3,20-dione, 100 milligrams of chromic anhydride, ten milliliters of glacial acetic acid and one-half milliliter of water. This mixture was stirred and thereupon maintained for eight hours at room temperature. Thereafter the mixture was poured into fifty milliliters of ice water, neutralized by the addition of dilute sodium hydroxide and the thus-obtained precipitate collected on a filter and dried to give 2-fluoro-6α-methyl-17α-hydroxy-4-pregnene-3,11,20-trione.

Following the procedure of Example 42, 2,9α-difluoro-6α-methyl-11β,17α-dihydroxy-4-pregnene-3,20-dione was oxidized to 2,9α-difluoro-6α-methyl-17α-hydroxy-4-pregnene-3,11,20-trione.

It is to be understood that the invention is not to be limited to the exact details of operation or exact compounds shown and described, as obvious modifications and equivalents will be apparent to one skilled in the art, and the invention is therefore to be limited only by the scope of the appended claims.

This application is a continuation-in-part of applications S.N. 759,400, and 759,432, both filed September 8, 1958, and both now abandoned. Application S.N. 759,400 is in turn a continuation-in-part of applications S.N. 510,517, filed May 23, 1955, now U.S. Patent 2,865,914, and S.N. 632,664, filed January 7, 1957, now abandoned.

We claim:

1. A compound selected from the group consisting of (1) 2α-halo-17α,21-dihydroxy-4-pregnene-3,20-dione represented by the following formula:

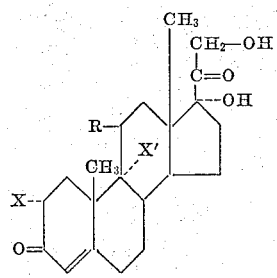

wherein X is a halogen having an atomic weight from 19 to 36, inclusive, X' is selected from the group consisting of halogen and hydrogen atoms, and R is selected from the group consisting of β-hydroxy and keto, and (2) 21-esters thereof of hydrocarbon carboxylic acids containing from one to twelve carbon atoms, inclusive.

2. 2α-chloro-11β,17α,21-trihydroxy-4-pregnene-3,20-dione.

3. 2α - fluoro - 11β,17α,21-trihydroxy-4-pregnene-3,20-dione.

4. 2α - halo - 11β,17α,21-trihydroxy-4-pregnene-3,20-dione 21-acylates wherein the acyl radical is that of a hydrocarbon carboxylic acid containing from one to twelve carbon atoms, inclusive, and the 2-halogen atom has an atomic weight from 19 to 36, inclusive.

5. 2α - chloro - 11β,17α,21-trihydroxy-4-pregnene-3,20-dione 21-acetate.

6. 2α - fluoro - 11β,17α,21-trihydroxy-4-pregnene-3,20-dione 21-acetate.

7. 2α - halo - 17α,21-dihydroxy-4-pregnene-3,11,20-trione 21-acylates wherein the acyl radical is that of a hydrocarbon carboxylic acid containing from one to twelve carbon atoms, inclusive, and the 2-halogen atom has an atomic weight from 19 to 36, inclusive.

8. 2α - fluoro - 17α,21 - dihydroxy-4-pregnene-3,11,20-trione 21-acetate.

9. 2α - fluoro - 17α,21 - dihydroxy-4-pregnene-3,11,20-trione.

10. 2α,9α - difluoro - 11β,17α,21 - trihydroxy - 4 - pregnene-3,20-dione 21-acylates wherein the acyl radical is that of a hydrocarbon carboxylic acid containing from one to twelve carbon atoms, inclusive.

11. 2α,9α - difluoro - 11β,17α,21 - trihydroxy - 4 - pregnene-3,20-dione 21-acetate.

12. 2α,9α - difluoro-11β,17α,21-trihydroxy-4-pregnene-3,20-dione.

13. A 2α,21-difluoro-17α-hydroxy-4-pregnene-3,20-dione represented by the formula:

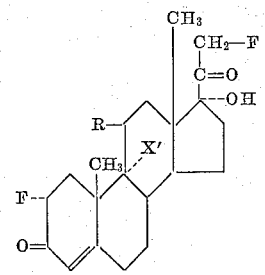

wherein X' is selected from the group consisting of chlorine, fluorine and hydrogen atoms and R is selected from the group consisting of β-hydroxy and keto.

14. 2α,21 - difluoro - 11β,17α - dihydroxy-4-pregnene-3,20-dione.

15. A 2α - fluoro - 17α-hydroxy-4-pregnene-3,20-dione represented by the formula:

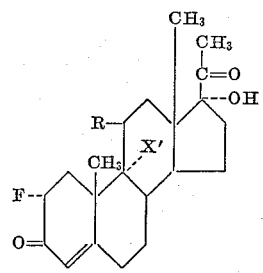

wherein X' is selected from the group consisting of chlorine, fluorine and hydrogen atoms and R is selected from the group consisting of β-hydroxy and keto.

16. 2α - fluoro-11β,17α - dihydroxy-4-pregnene-3,20-dione.

17. A compound selected from the group consisting of (1) 2α - fluoro-6α-methyl-17α,21-dihydroxy-4-pregnene-3,20-dione represented by the formula:

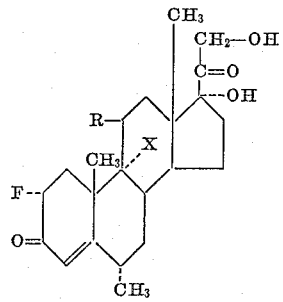

wherein X is selected from the group consisting of halogen and hydrogen atoms, and R is selected from the group consisting of β-hydroxy and keto, and (2) 21-esters thereof of hydrocarbon carboxylic acids containing from one to twelve carbon atoms, inclusive.

18. 2α - fluoro-6α-methyl-17α,21-dihydroxy-4-pregnene-3,11,20-trione.

19. 2α - fluoro - 6α - methyl-11β,17α,21-trihydroxy-4-pregnene-3,20-dione.

20. 2α - fluoro - 6α - methyl-11β,17α,21-trihydroxy-4-pregnene-3,20-dione 21-acylates wherein the acyl radical is that of a hydrocarbon carboxylic acid containing from one to twelve carbon atoms, inclusive.

21. 2α - fluoro - 6α - methyl-11β,17α 21-trihydroxy-4-pregnene-3,20-dione 21-acetate.

22. 2α - fluoro-6α-methyl-17α,21-dihydroxy-4-pregnene-3,11,20-trione 21-acylates wherein the acyl radical is that of a hydrocarbon carboxylic acid containing from one to twelve carbon atoms, inclusive.

23. 2α - fluoro-6α-methyl-17α,21-dihydroxy-4-pregnene-3,11,20-trione 21-acetate.

24. 2α,9α - difluoro-6α-methyl-11β,17α,21-trihydroxy-4-pregnene-3,20-dione 21-acylates wherein the acyl radical is that of a hydrocarbon carboxylic acid containing from one to twelve carbon atoms, inclusive.

25. 2α,9α - difluoro-6α-methyl-11β,17α,21-trihydroxy-4-pregnene-3,20-dione 21-acetate.

26. 2α,9α - difluoro-6α-methyl-11β,17α,21-trihydroxy-4-pregnene-3,20-dione.

27. 2α,9α - difluoro - 6α - methyl-17α,21-dihydroxy-4-pregnene-3,11,20-trione 21-acylates wherein the acyl radical is that of a hydrocarbon carboxylic acid containing from one to twelve carbon atoms, inclusive.

28. 2α,9α - difluoro - 6α - methyl-17α,21-dihydroxy-4-pregnene-3,11,20-trione 21-acetate.

29. 2α,9α - difluoro - 6α - methyl-17α,21-dihydroxy-4-pregnene-3,11,20-trione.

30. A 2α,21 - difluoro - 6α - methyl - 17α - hydroxy - 4-pregnene-3,20-dione represented by the formula:

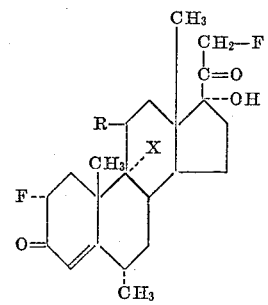

wherein X is selected from the group consisting of chlorine, fluorine and hydrogen atoms and R is selected from the group consisting of β-hydroxy and keto.

31. 2α,21 - difluoro - 6α - methyl - 11β,17α - dihydroxy-4-pregnene-3,20-dione.

32. A 2α - fluoro - 6α - methyl - 17α - hydroxy - 4-pregnene-3,20-dione represented by the formula:

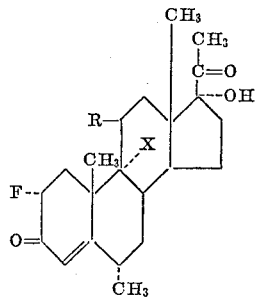

wherein X is selected from the group consisting of chlorine, fluorine and hydrogen atoms and R is selected from the group consisting of β-hydroxy and keto.

33. 2α - fluoro - 6α - methyl - 11β,17α - dihydroxy - 4-pregnene-3,20-dione.

No references cited.

LEWIS GOTTS, *Primary Examiner.*